(12) United States Patent
Che

(10) Patent No.: US 12,239,914 B2
(45) Date of Patent: Mar. 4, 2025

(54) PUZZLE PLATFORM

(71) Applicant: Xiaoling Che, Hubei (CN)

(72) Inventor: Xiaoling Che, Hubei (CN)

( * ) Notice: Subject to any disclaimer, the term of this patent is extended or adjusted under 35 U.S.C. 154(b) by 0 days.

(21) Appl. No.: 18/734,521

(22) Filed: Jun. 5, 2024

(65) Prior Publication Data
US 2024/0316447 A1 Sep. 26, 2024

Related U.S. Application Data

(63) Continuation-in-part of application No. 18/541,685, filed on Dec. 15, 2023, now Pat. No. 12,042,740, which is a continuation of application No. 17/505,587, filed on Oct. 19, 2021, now Pat. No. 11,890,551, application No. 18/734,521, filed on Jun. 5, 2024 is a continuation-in-part of application No. 18/530,402, filed on Dec. 6, 2023, now Pat. No. 12,053,709, which is a continuation-in-part of application No. 17/505,587, filed on Oct. 19, 2021, now Pat. No. 11,890,551, and a continuation-in-part of application No. 17/829,359, filed on Jun. 1, 2022,
(Continued)

(30) Foreign Application Priority Data

| Sep. 26, 2021 | (CN) | 202111131554.1 |
| Sep. 26, 2021 | (CN) | 202122334815.1 |
| Jun. 13, 2023 | (CN) | 202330364018.X |
| Feb. 8, 2024 | (CN) | 202420292101.X |
| Apr. 18, 2024 | (CN) | 202430220715.2 |
| Apr. 30, 2024 | (CN) | 202430254326.1 |

(51) Int. Cl.
*A63F 9/00* (2006.01)
*A63F 9/10* (2006.01)
*F16M 11/04* (2006.01)

(52) U.S. Cl.
CPC .............. *A63F 9/1044* (2013.01); *A63F 9/10* (2013.01); *A63F 2009/105* (2013.01); *F16M 11/046* (2013.01)

(58) Field of Classification Search
CPC .............. A63F 9/1044; A63F 2009/105; A47B 13/081; A47B 13/00; A47B 23/001; A47B 83/045; F16M 11/046; F16M 11/14
USPC ..................................................... 273/153 R
See application file for complete search history.

(56) References Cited

U.S. PATENT DOCUMENTS

| 353,763 | A | * | 12/1886 | Seipelt | .................. | A47B 97/08 |
| | | | | | | 248/463 |
| 1,848,854 | A | * | 3/1932 | Urich | ....................... | G09F 1/14 |
| | | | | | | 248/452 |

(Continued)

*Primary Examiner* — Nkeisha Smith

(57) ABSTRACT

A puzzle platform, for placing on a playing place, includes a puzzle board having a puzzle plate for placing a plurality of puzzle pieces thereon and at least one puzzle drawer located below the puzzle plate, a kickstand for supporting the puzzle board on the playing surface, a rotating device coupled to the puzzle board and spaced apart from the kickstand. When the kickstand supports the puzzle board, the puzzle plate, the rotating device and the puzzle drawer are respectively inclined relative to the playing place, and the rotating device is in a non-working state. When the kickstand does not support the puzzle board, the puzzle board can be rotated on the playing place via the rotating device, and the kickstand is in a non-working state. The puzzle platform allows the player to conveniently play puzzle pieces.

30 Claims, 30 Drawing Sheets

Related U.S. Application Data now Pat. No. 12,104,744, and a continuation-in-part of application No. 18/235,416, filed on Aug. 18, 2023, now Pat. No. 12,059,631, application No. 18/734,521, filed on Jun. 5, 2024 is a continuation of application No. 18/235,896, filed on Aug. 21, 2023, now Pat. No. 12,048,885, which is a continuation-in-part of application No. 17/505,587, filed on Oct. 19, 2021, now Pat. No. 11,890,551, and a continuation-in-part of application No. 17/829,359, filed on Jun. 1, 2022, now Pat. No. 12,104,744, application No. 18/734,521, filed on Jun. 5, 2024 is a continuation-in-part of application No. 18/235,416, filed on Aug. 18, 2023, now Pat. No. 12,059,631, which is a continuation-in-part of application No. 17/505,587, filed on Oct. 19, 2021, now Pat. No. 11,890,551, and a continuation-in-part of application No. 17/829,359, filed on Jun. 1, 2022, now Pat. No. 12,104,744, application No. 18/734,521, filed on Jun. 5, 2024 is a continuation-in-part of application No. 17/829,359, filed on Jun. 1, 2022, now Pat. No. 12,104,744.

(56) References Cited

U.S. PATENT DOCUMENTS

| | | | | |
|---|---|---|---|---|
| 1,987,496 A * | 1/1935 | Springborn | A63F 9/1044 | 273/157 R |
| 2,506,189 A * | 5/1950 | Attridge | A63F 9/1044 | 40/739 |
| 2,812,183 A * | 11/1957 | Schiff | A63H 33/38 | 273/459 |
| 3,123,935 A * | 3/1964 | Williams | A47B 13/16 | 248/500 |
| 3,433,485 A * | 3/1969 | Renn | A63F 9/10 | 434/84 |
| 4,513,974 A * | 4/1985 | Lin | A63F 3/0023 | 273/287 |
| 4,591,161 A * | 5/1986 | Vanderhoof | A63F 3/0423 | 273/272 |
| 4,645,209 A * | 2/1987 | Goulter | A63F 3/02 | 273/287 |
| 4,659,050 A * | 4/1987 | Tabayashi | F16C 33/588 | 248/349.1 |
| 4,850,595 A * | 7/1989 | Sherman | A63F 9/0098 | 273/272 |
| 4,865,325 A * | 9/1989 | Stolz | A63F 9/1044 | 273/157 R |
| 5,174,538 A * | 12/1992 | Okada | F16C 33/38 | 384/615 |
| 5,269,524 A * | 12/1993 | Womack | A63F 3/0023 | 273/285 |
| 5,647,151 A * | 7/1997 | Fantone | G11B 23/0233 | |
| 6,435,503 B1 * | 8/2002 | Laughlin | A63F 9/1044 | 229/103 |
| 6,928,932 B1 * | 8/2005 | Ferrill | A47B 37/00 | 108/26 |
| 7,273,212 B1 * | 9/2007 | Kolbaba | A47B 25/00 | 108/103 |
| 7,836,623 B2 * | 11/2010 | Wang | A47G 1/142 | 248/458 |
| 8,023,256 B2 * | 9/2011 | Walker | G06F 1/162 | 361/679.3 |
| 8,152,113 B2 * | 4/2012 | Chen | G06F 1/1601 | 248/371 |
| 8,327,774 B1 * | 12/2012 | Rivera | B60N 3/005 | 108/50.02 |
| 9,044,688 B1 * | 6/2015 | Janay | B65D 25/22 | |
| 11,388,990 B1 * | 7/2022 | Watkins | A63F 9/1044 | |
| 2011/0025176 A1 * | 2/2011 | McClure | A47B 23/042 | 248/371 |
| 2021/0062967 A1 * | 3/2021 | Tsai | F16M 13/022 | |
| 2021/0170268 A1 * | 6/2021 | Malki | A63F 9/1044 | |
| 2021/0260495 A1 * | 8/2021 | Seder | G03B 25/02 | |

* cited by examiner

PUZZLE PLATFORM

CROSS REFERENCES AND PRIORITIES

This application is a continuation-in-part of U.S. patent application Ser. No. 18/530,402 filed on Dec. 6, 2023, which is a continuation-in-part of U.S. patent application Ser. No. 17/829,359 filed on Jun. 1, 2022, and a continuation-in-part of U.S. patent application Ser. No. 18/235,416 filed on Aug. 18, 2023;
 a continuation application of U.S. patent application Ser. No. 18/235,896 filed on Aug. 21, 2023, which is a continuation-in-part of U.S. patent application Ser. No. 17/829,359 filed on Jun. 1, 2022;
 a continuation-in-part of U.S. patent application Ser. No. 18/235,416 filed on Aug. 18, 2023, which is a continuation-in-part of U.S. patent application Ser. No. 17/829,359 filed on Jun. 1, 2022; and
 a continuation-in-part of U.S. patent application Ser. No. 17/829,359 filed on Jun. 1, 2022, the contents of each of which are incorporated by reference in their entirety.

BACKGROUND OF THE PRESENT INVENTION

Field of Invention

The present invention relates to a puzzle game apparatus, and more particularly to a puzzle platform, wherein the puzzle platform is configured for retaining all the unfinished pieces and allowing the player to conveniently play the puzzle.

Description of Related Arts

Puzzles are devised over the years and are among the most popular board games, generally played alone by an individual. It is well known that puzzles are beneficial for the brain. Studies have shown that playing puzzles can improve cognition, visual-spatial reasoning, concentration, and patience.

Other than as a means of entertainment and enjoyment, players would like to challenge themselves by attempting higher piece counts in puzzles. Generally, the higher the piece count, the more difficult the puzzle becomes. However, a common drawback or burden for the player is the relatively large finished size of the puzzles. For example, a finished size of 1,000 piece puzzles is about 30"×24", a finished size of 5,000 piece puzzles is about 60"×40", and so on. In other words, these puzzles require a relatively large playing surface such as the surface of a table or a puzzle board for putting all the pieces together to form a puzzle figure. Therefore, to play a relatively large puzzle, for example 60"×40" or more, the side length of the puzzle board is longer than the player's arm length that the player is unable to reach the other sides of the puzzle board, so that the player is required to move around the playing surface to put pieces at different directions and portions near each side of the puzzle board. As a skilled player, the strategies for playing the puzzles are configured for sorting the pieces into groups and assembling the border first. Therefore, the player will need to move from one side of the playing surface to another side thereof to play the puzzles. Furthermore, it could take hours, days or even months to compete a larger scale puzzle. One or more puzzle pieces could be missed accidentally or unintentionally. It is sad that the player usually finds out there is a missing piece at the end. Therefore, how to avoid losing any pieces, it is best to find a container to save all the unfinished pieces.

When a player challenges a larger scale puzzle, it is necessary to prepare a puzzle platform with sufficient bearing area. However, the arm length of the player is often insufficient to reach the entire game area, and the viewing angle range of the player is not enough to pay attention to the entire game area. As a result, the player often needs to move the position of the puzzle during the game process. Therefore, the player would expect to tilt the game area towards himself/herself for better access and observation of the entire game area. However, it is understood that when a plane is obliquely placed, it is easier to overturn, resulting in insufficient stability of the game area. Unfortunately, conventional puzzle platforms cannot meet the player's requirements due to insufficient stability. Additionally, the player needs to pay attention to avoid leaning and affecting the stability of the puzzle platform, leading the player to feel uneasy due to self-restraint, significantly diminishing the gaming experience.

There is a need for a tool that retains all unfinished pieces while allowing the player to conveniently play the puzzle. It is the provision of such a tool that the present invention primarily addresses.

SUMMARY OF THE PRESENT INVENTION

The invention is advantageous in that it provides a puzzle platform, wherein the puzzle platform comprises a puzzle board having a puzzle plate for placing a plurality of puzzle pieces thereon and at least one puzzle drawer located below the puzzle plate, a kickstand for supporting the puzzle board on the playing surface, a rotating device coupled to the puzzle board and spaced apart from the kickstand. When the kickstand supports the puzzle board, the puzzle plate, the rotating device and the puzzle drawer are respectively inclined relative to the playing place, and the rotating device is in a non-working state. When the kickstand does not support the puzzle board, the puzzle board can be rotated on the playing place via the rotating device, and the kickstand is in a non-working state.

Optionally, the kickstand and the rotating device are spaced apart in the thickness direction of the puzzle plate, a plane in which the puzzle plate is located is defined as a projection plane, a projection of the kickstand on the projection plane and a projection of the rotating device on the projection plane at least partially overlap.

Optionally, a plane in which the puzzle plate is located is defined as a projection plane, a projection of the kickstand on the projection plane and a projection of the rotating device on the projection plane do not overlap.

Optionally, a plane in which the puzzle plate is located is defined as a projection plane, a projection of the kickstand on the projection plane falls within the range of a projection of the rotating device on the projection plane.

Optionally, a diameter of the rotating device is greater than the length of the kickstand.

Optionally, the kickstand is rotatably connected to the puzzle board, the kickstand can be rotated around a rotating axis between a closed position and an open position, the kickstand has a rotating end rotating around the rotating axis and a free end far from the rotating end, and when the kickstand is in the open position, the free end of the kickstand supports on the playing place.

Optionally, the rotating device comprises a near end close to the rotating axis, and the near end of the rotating device is closer to the rotating axis than the free end of the kickstand.

Optionally, the rotating device comprises a near end close to the rotating axis, and the free end of the kickstand is closer to the rotating axis than the near end of the rotating device.

Optionally, the rotating device further comprises a far end far from the rotating axis, and the far end is closer to the rotating axis than the free end.

Optionally, the puzzle platform further comprises a connecting frame coupled on the puzzle plate, and the rotating device is connected to the connecting frame away from the puzzle plate.

Optionally, the connecting frame has an avoidance groove for receiving the kickstand.

Optionally, the puzzle platform further comprises a reinforcing member located below the puzzle plate, the rotating device is connected to the puzzle board via the reinforcing member.

Optionally, the puzzle platform further comprises a reinforcing member located below the puzzle plate, the reinforcing member comprises a pair of first reinforcing ribs spaced apart from each other for forming a receiving chamber, the kickstand is received in the receiving chamber.

Optionally, the puzzle board further comprises an extending wall for supporting the puzzle plate and a stopping rib coupled with the puzzle plate and spaced apart from the extending wall for abutting against the kickstand when the kickstand is in the open position.

Optionally, wherein the reinforcing member further comprises a reinforcing rib received in the receiving chamber for coupling with the kickstand.

Optionally, the kickstand is coupled with the first reinforcing ribs.

Optionally, wherein the kickstand is made of metal wires.

Optionally, wherein the rotating device comprises a hollow area, the kickstand is opened through the hollow area of the rotating device.

Optionally, wherein the rotating device has a support surface protruding from the puzzle board on the side away from the puzzle plate, when the kickstand is in the closed position, it is closer to the puzzle plate of the puzzle board relative to the support surface.

Optionally, wherein the rotating assembly is separated from the kickstand along the extension direction of the puzzle board.

Still further objects and advantages will become apparent from a consideration of the ensuing description and drawings. These and other objectives, features, and advantages of the present invention will become apparent from the following detailed description, the accompanying drawings, and the appended claims.

DETAILED DESCRIPTION OF THE PREFERRED EMBODIMENTS

Figure 1:
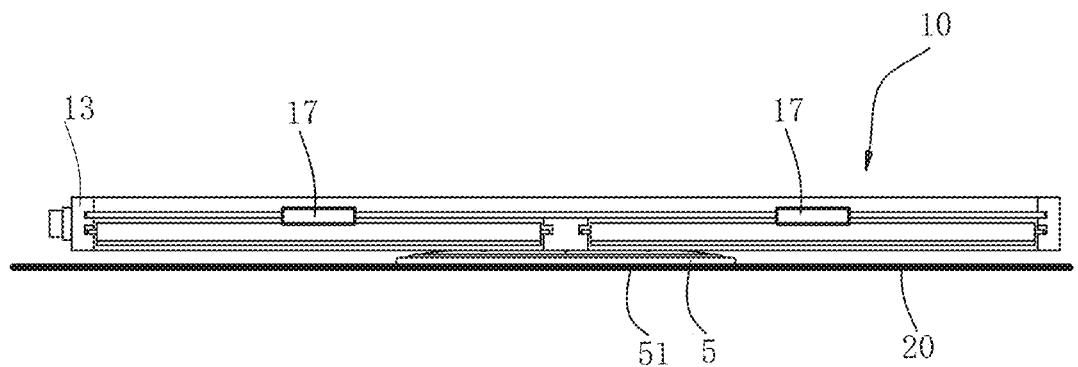
FIG. 1 is an illustrative isometric side view of a puzzle platform according to a first embodiment of the present invention, illustrating a kickstand in a closed position.

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Referring to FIGS. 1 to 9, a puzzle platform 10 according to a first embodiment of the present invention is illustrated. The puzzle platform 10 is arranged for a user or a player to assemble a plurality of puzzle pieces 100 thereon and is supported on a playing place 20, such as a table surface, a wall surface, a floor surface, or even a support frame for supporting the puzzle platform 10 on the ground. Accordingly, the puzzle platform 10 comprises a puzzle board 1, a kickstand 3, and a rotating device 5. The puzzle board 1 has a first side 101 and a second side 103 opposite to the first side 101. The puzzle board 1 comprises a puzzle plate 11, at least one puzzle drawer 17 disposed under the puzzle plate 11, and a supporting frame 12 supporting the puzzle plate 11. The supporting frame 12 comprises an extending wall 13 for supporting the puzzle plate 11 and preventing the puzzle pieces 100 from falling off the puzzle plate 11 when the puzzle board 1 is rotated on the playing place via a rotation movement of the rotating device 5 and/or when the puzzle platform 10 is moved by a user or a player from one place to another. In this embodiment, the extending wall 13 and the puzzle plate 11 are enclosed together to form the first chamber 105 on the first side 101 and the second chamber 107 on the second side 103.

The puzzle board 1 further comprises an anti-slipping layer 14 overlappedly provided on the puzzle plate 11 to prevent the puzzle pieces 100 from slipping. Preferably, the anti-slipping layer 14 has a self-adhesive bottom surface adhered to the puzzle plate 11, wherein the anti-slipping layer 14 can be removed from the playing surface 11 without damaging the puzzle plate 11 and the anti-slipping layer 14. Therefore, the anti-slipping layer 14 is reusable to place on the playing surface 11. Furthermore, the anti-slipping layer 14 serves as a backing layer for the puzzle pieces 100 after they are assembled. The extending wall 13 projects out of the anti-slipping layer 14 so that it can also limit the sliding of the puzzle pieces 100.

Figure 8:
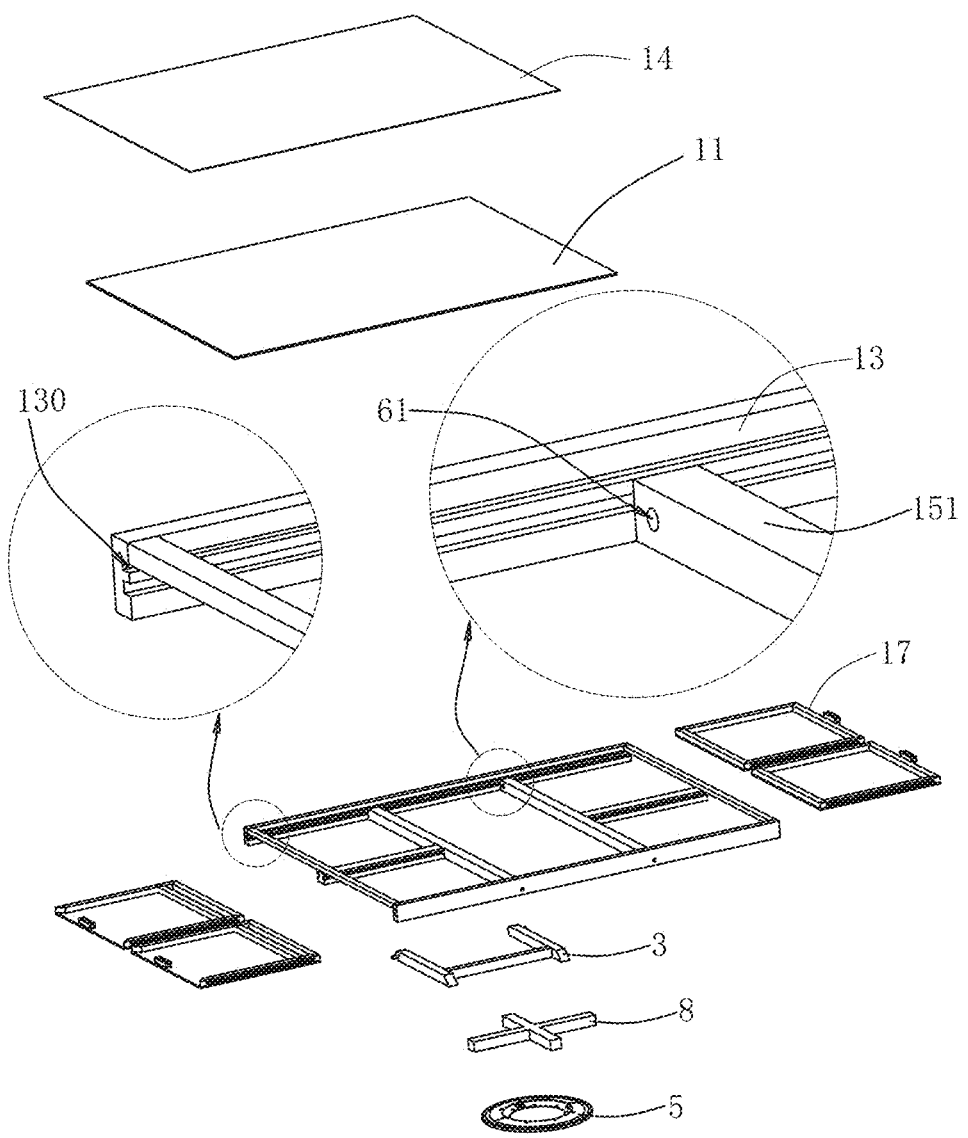
FIG. 8 is a partially exploded perspective view of the puzzle platform shown in FIG. 1.

As shown in FIG. 8, a receiving space 130 is provided on an inner circumferential surface of the extending wall 13, and an outer peripheral edge of the puzzle plate 11 is embedded in the receiving space 130. Preferably, the extending wall 13 is formed by splicing a plurality of strips 131 so as to embed the outer peripheral edge of the puzzle plate 11 into the receiving space 130 of the extending wall 13.

It can be understood that in other embodiments, the extending wall 13 and the puzzle plate 11 can be arranged to enclose and form only the first chamber 105 that opens on the second side 103. The second chamber 107 can be omitted.

The supporting frame 12 further comprises a reinforcing member 15 located within the first chamber 105. The reinforcing member 15 is respectively connected to the extending wall 13 and the puzzle plate 11, thereby providing support force for the puzzle plate 11. Optionally, the reinforcing member 15 may be solely connected to the extending wall 13, or the reinforcing member 15 may be solely connected to the puzzle plate 11.

The reinforcing member 15 comprises a pair of first reinforcing ribs 151 and a pair of second reinforcing ribs 153 for forming a plurality of drawer cavities to receive the corresponding drawer 17. The pair of the first reinforcing ribs 151 are spaced apart along a first direction X to form a receiving chamber Each of the first reinforcing ribs 151 extends at its two ends along a second direction Y to connect with the extending wall 13. Each of the second reinforcing rib 153 extends at its two ends along the first direction X to connect with the extending wall 13 and is interlaced with the first reinforcing ribs 151. The first direction X is perpendicular to the second direction Y. It can be understood that in other embodiments, the second reinforcing ribs can be omitted. In this embodiment, the number of the first reinforcing ribs is two. Optionally, the number of the first reinforcing rib and the second reinforcing rib may differ. It should be noted that the number of the reinforcing ribs shall not be limited to either one or two. The puzzle plate 11, the extending wall 13, and the reinforcing member 15 are made of plastic, wood, or metal, preferably wood.

As shown in FIGS. 3-6, the puzzle board 1 has a rectangular shape. The first direction X is the length direction of the puzzle board 1, and the second direction Y is the width direction of the puzzle board 1. It can be understood that in other embodiments, the puzzle board 1 could be cylindrical, circular, square and so on. The puzzle drawers 17 are located between the second reinforcing ribs 153 and the extending wall 13. The puzzle drawers 17 can be used to store puzzle pieces, thereby avoiding losing the puzzle pieces.

The kickstand 3 is pivotally connected to the puzzle board 1, and the kickstand 3 is pivotally folded between a closed position and an open position around a rotating axis 2. The first direction X is parallel to the rotating axis 2. The kickstand 3 comprises a rotating end 31 rotating around the rotating axis 2 and a free end 33 far from the rotating end 31. When the kickstand 3 is in the open position, the kickstand 3 supports the puzzle board 1, and the free end 33 of the kickstand 3 is placed on the playing place 20. Under the support of the kickstand 3, the puzzle board 1 is inclined and supported on the playing place 20, and the puzzle plate 11 of the puzzle board 1 and the puzzle drawers 17 are respectively inclined relative to the playing place 20. The rotating device 5 is also inclined relative to the playing place 20 in a non-working state. At least a part of the puzzle board 1 extending along second direction Y is supported on the playing place 20 for cooperating with the kickstand to support the puzzle board 1 on the playing surface 20.

Figure 2:
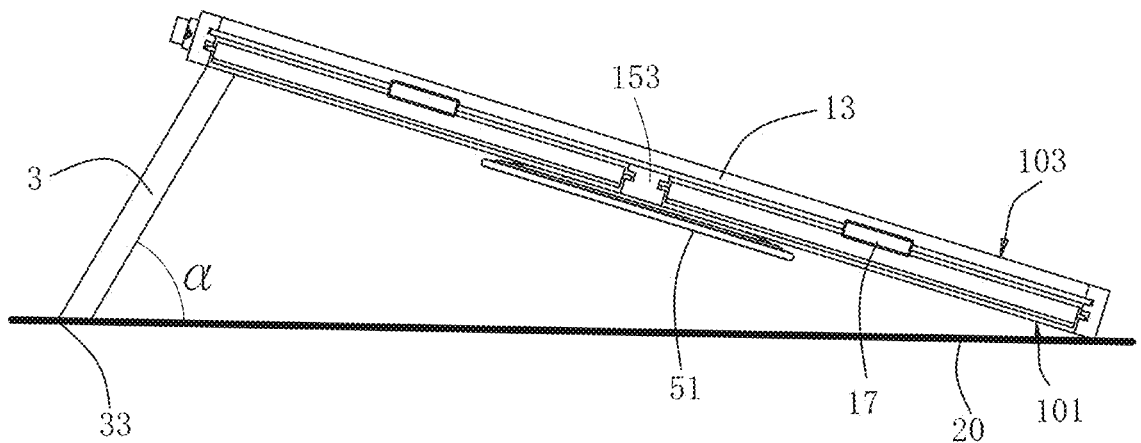
FIG. 2 is an illustrative isometric side view of the puzzle platform shown in FIG. 1, illustrating the kickstand in an open position.
Figure 6:
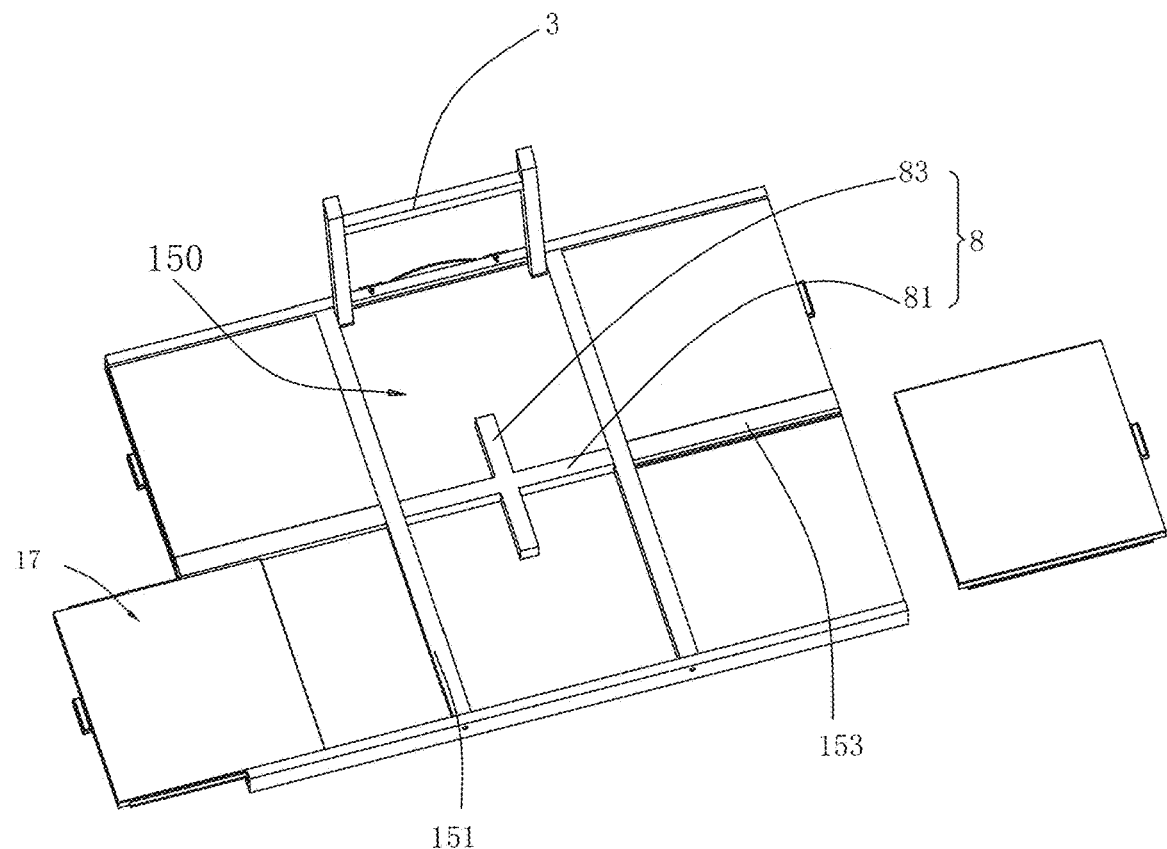
FIG. 6 is an illustrative isometric view of the puzzle platform shown in FIG. 3, with puzzle drawers partially pulled out of a corresponding drawer cavity, and the rotating device removed.
Figure 7:
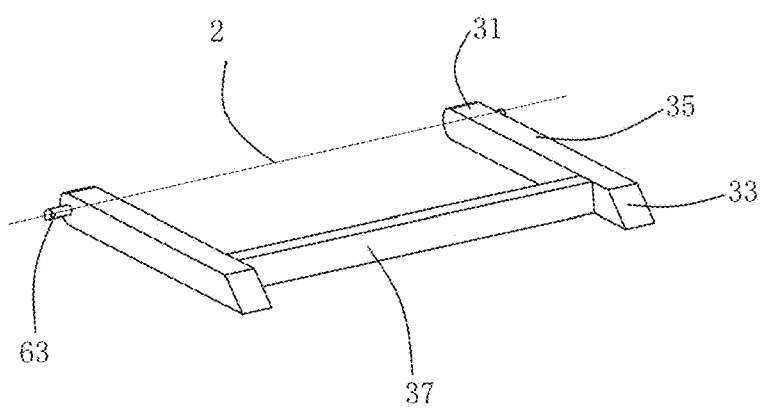
FIG. 7 is an illustrative isometric view of the kickstand of the puzzle platform shown in FIG. 3.

As shown in FIGS. 2 and 6, for convenient operation, each of the puzzle drawers 17 is pulled out along the first direction X. When the puzzle drawers 17 are being pulled out, distances between each puzzle drawer 17 and the playing place 20 remain unchanged. The kickstand 3 supports the puzzle board 1 in the thickness direction of the puzzle board 1. Since the puzzle drawers 17 are pulled out along the first direction X, the inclination direction of the puzzle board 1 does not affect the pulling operation of the puzzle drawers 17. By reasonably setting the pulling direction of the puzzle drawers 17 and the inclination method of the puzzle board 1, the convenience of the player's operation is improved.

It should be noted that the term "the closed position" means that the kickstand 3 is parallel or substantially parallel to the puzzle plate 11 of the puzzle board 1; the term "the open position" means that the free end 33 of the kickstand 3 is placed and supported on the playing place 20. An angle between the playing place 20 and the kickstand is a. Preferably, 90°>α>0°.

Figure 3:
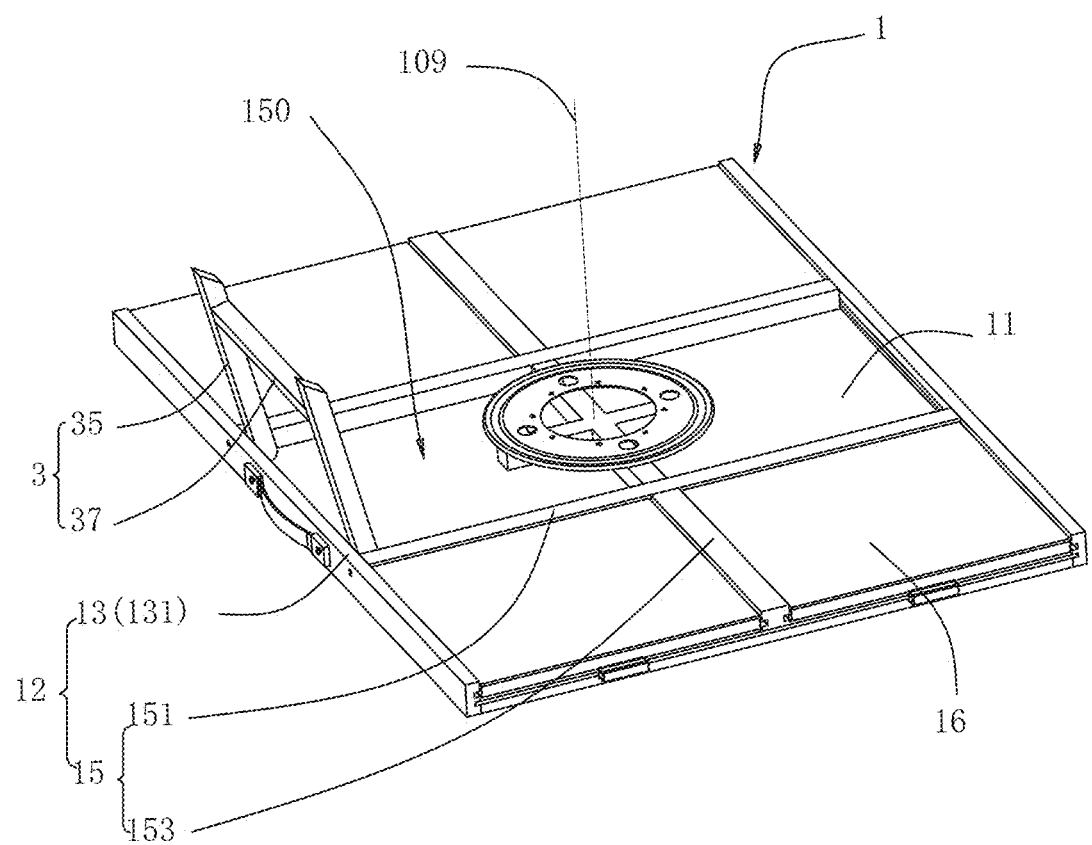
FIG. 3 is an illustrative isometric view of the puzzle platform shown in FIG. 1, illustrating the kickstand in the open position.
Figure 4:
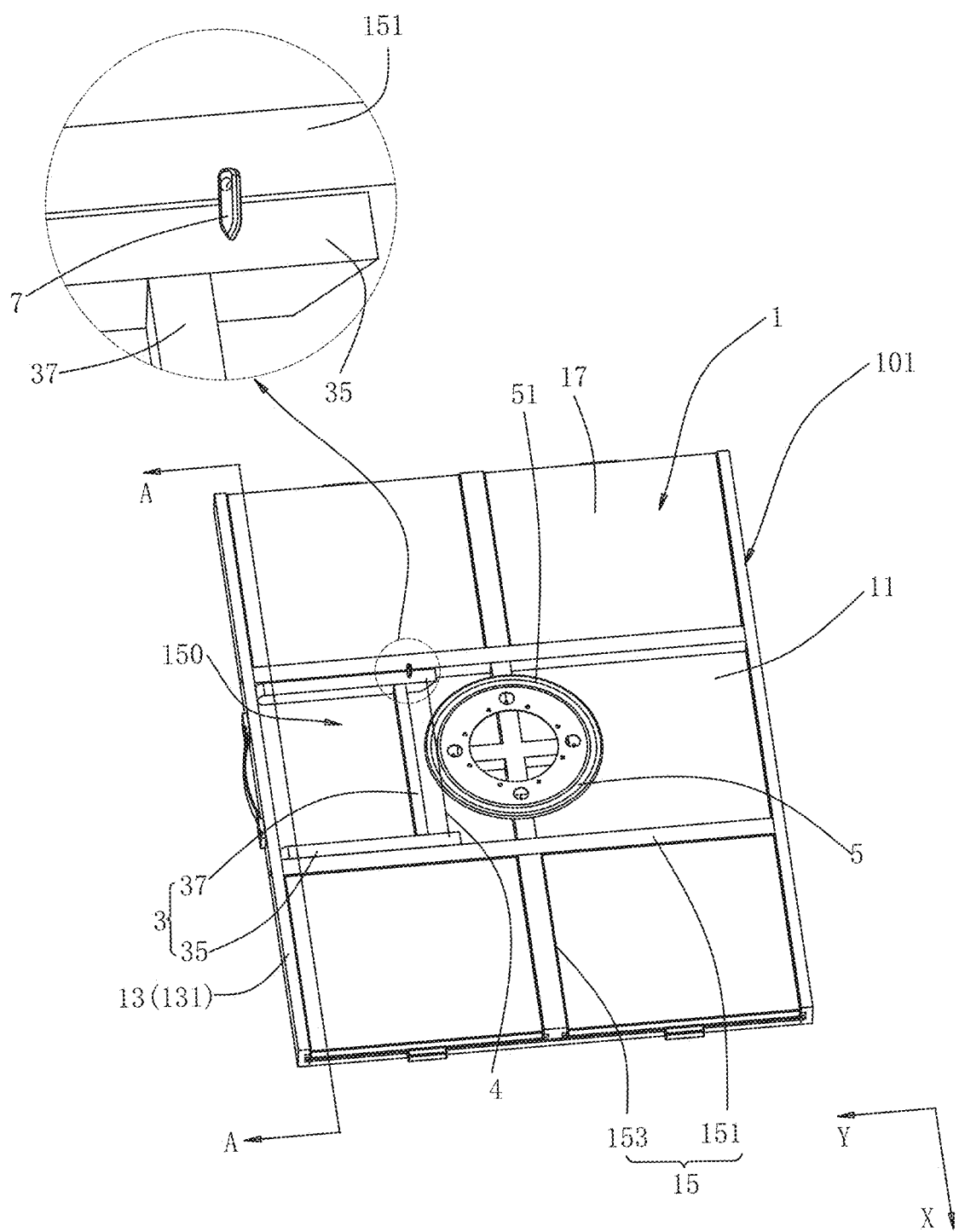
FIG. 4 is an illustrative isometric view of the puzzle platform shown in FIG. 1, illustrating the kickstand in the closed position.

As shown in FIGS. 2-4, the kickstand 3 is pivotally folded on the puzzle board 1 at the first side 101 so that the kickstand 3 in the closed position is accommodated within the receiving chamber 150. In this embodiment, the puzzle platform 10 has a rotating connection member 6, and the kickstand 3 is pivotally connected to the first reinforcing ribs 151 of the puzzle board 1 through the rotating connection member 6. The rotating axis 2 is the rotating axis of the rotating connection member 6. In this embodiment, the rotating connection member 6 should be freely rotated so that the kickstand 3 can be freely rotated between the closed position and the open position.

The puzzle board 1 limits the kickstand 3 in the open position, and the puzzle board 1 further has a stopper element 7 for limiting the kickstand 1 in the closed position. Since the rotating connection member 6 is set to be freely rotatable so that the kickstand 6 can be freely rotated between the closed position and the open position, when the kickstand 3 is rotated to the closed position, it needs to be restricted from rotating to allow the kickstand 3 to stably stay in the closed position; when the kickstand 3 is rotated to the open position, it also needs to be restricted from rotating to allow the kickstand 3 to stably stay in the open position.

In this embodiment, when the kickstand 3 is pivotally folded to the open position, the extending wall 13 abuts against the kickstand 3 to lock the kickstand 3 in the open position; the stopper element 7 is rotatably connected to the first reinforcing rib 151 so that the kickstand 3 can be locked by the stopper element 7.

When the kickstand 3 is in the closed position, the stopper element 7 is rotated to a locking position so that the kickstand 3 is limited in the closed position by the stopper element 7. When the stopper element 7 is rotated to an unlocking position, the kickstand 3 can be rotated between the closed position and the open position.

It should be noted that the stopper element 7 being in the locking position means that the stopper element 7 is rotated to block the rotation path of the kickstand 3. The stopper element 7 being in the unlocking position means that the stopper element 7 is rotated to a position where it does not block the rotation of the kickstand 3.

In this embodiment, the rotating connection member 6 comprises a receiving hole 61 and a rotating shaft 63 inserted into the receiving hole 61, where one of the receiving holes 61 and the rotating shaft 63 is arranged on the kickstand 3, and the other is arranged on the first reinforcing rib 151 of the puzzle board 1. The axis of the rotating shaft 63 is the rotating axis 2 of the rotating connection member 6. It can be understood that in other embodiments, the rotating connection member can also adopt other freely rotatable rotating connection members 6.

Figure 5:
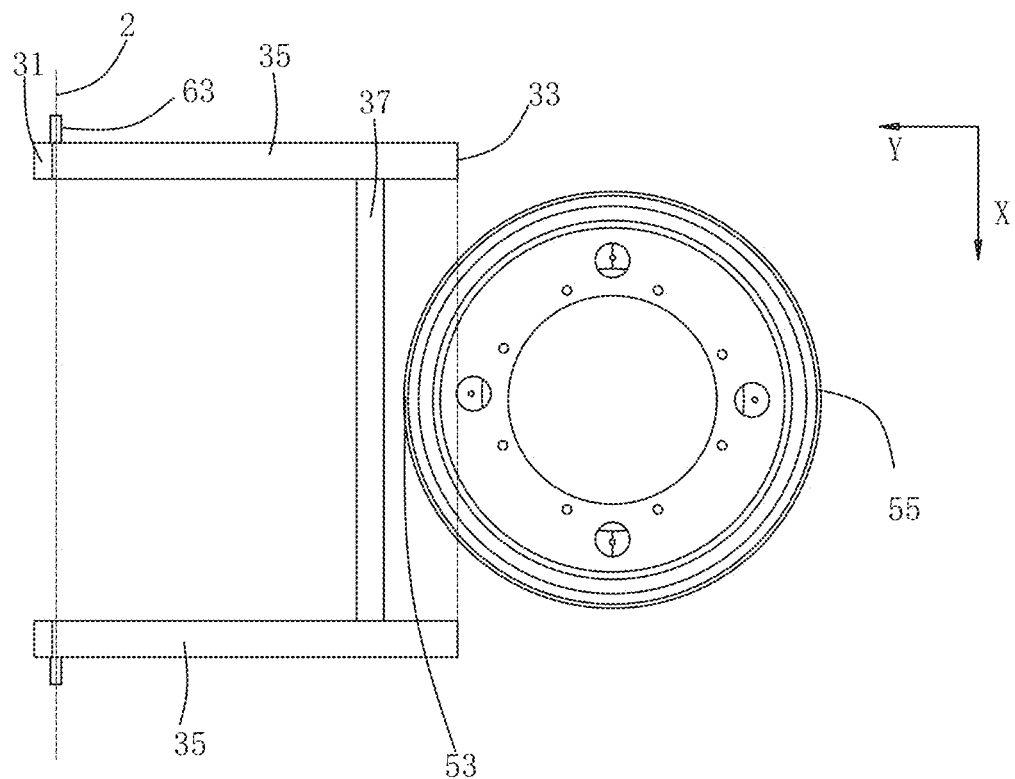
FIG. 5 is an illustrative top plan view of the kickstand, a rotating device and a rotating axis of the puzzle platform of FIG. 3.

As shown in FIG. 5, the kickstand 3 comprises a pair of extending arms 35 spaced apart along the first direction X and a connecting arm 37. The extending arms 35 extend along the second direction Y, and the two ends of the connecting arm 37 extend along the first direction X to connect with the extending arms 35. The extending arms 35 are rotatably connected to the first reinforcing ribs 151 through the rotating connection member 6. The rotating end 31 is the connecting end of the extending arms 35 with the rotating connection member 6. The free end 33 is the end of the extending arms 35 far from the rotating connection member 6. It can be understood that in other embodiments, the connecting arm can be omitted, and correspondingly, when the kickstand does not include the connecting arm, there may be only one extending arm, or a plurality of connecting arms 37 may be provided.

When the kickstand 3 is in the open position, the extending arms 35 abut against the extending wall 13, thereby blocking the kickstand 3 from continuing rotating in the direction away from the closed position through the extending wall 13, so that the puzzle board 1 limits the kickstand 3 in the open position. When the kickstand 3 is in the closed position, at least one of the extending arms 35 is limited between the stopper element 7 and the puzzle plate 11, so that the stopper element 7 limits the kickstand 3 in the closed position.

The extending arms 35 and the connecting arm 37 are cube-shaped. In this embodiment, the rotating shaft 63 is provided on one of the extending arms 35, correspondingly, the receiving hole 61 can be provided on one of the first reinforcing ribs 151. It can be understood that in other embodiments, the receiving hole can also be provided on one of the extending arms, and correspondingly, the rotating shaft is provided on one of the first reinforcing ribs.

The rotating device 5 is connected to the puzzle board 1 at the first side 101 and is spaced apart from the kickstand 3. A plane in which the puzzle plate 11 is located is defined as a projection plane. The projection of the kickstand 3 on the projection plane and the projection of the rotating device 5 on the projection plane do not overlap. When the kickstand 3 is in the closed position, the kickstand 3 does not support the puzzle board 1, and the puzzle board 1 can be rotated on the playing place 20 through the rotating device 5. The rotating angle of the puzzle board 1 is preferably set to 360°.

Specifically, the rotating device 5 has a support surface 51 protruding from the puzzle board 1 on the side away from the puzzle plate 11. When the kickstand 3 is in the closed position, both the kickstand 3 and the rotating device 5 are located on the same side as the puzzle plate 11, with the kickstand 3 being closer to the puzzle plate 11 of the puzzle board 1 than the support surface 51. In this way, when the support surface 51 is supported by the playing place 20, the puzzle board 1 can be rotated under the action of the rotating device 5 by an external force. In other words, when the kickstand 3 is in the closed position, the puzzle board 1 and the kickstand 3 will not contact the playing place 20, so that the puzzle board 1 can be rotated under the action of the rotating device 5 by the external force.

It should be noted that when the puzzle board 1 is inclined and supported on the playing place 20 under the support of the kickstand 3, the rotating device 5 may either be spaced apart from or in contact with the playing place 20.

The rotating device 5 has a near end 53 close to the rotating axis 2 and a far end 55 away from the rotating axis 2. As shown in FIG. 5, the rotating device 5 has an overall circular structure, with the near end 53 and the far end 55 located at the two ends of a diameter of a circle. It can be understood that in other embodiments, the rotating device 5 can also be rectangular.

In this embodiment, the near end 53 is closer to the rotating axis 2 than the free end 33, and the free end 33 is closer to the rotating axis 2 than the far end 55, thereby allowing the puzzle board 1, supported by the kickstand 3, to have a larger designed inclination angle. The positional relationship between the kickstand 3 and the rotating device 5 is provided reasonably, making the overall structure of the puzzle platform reasonable and compact.

Figure 9:
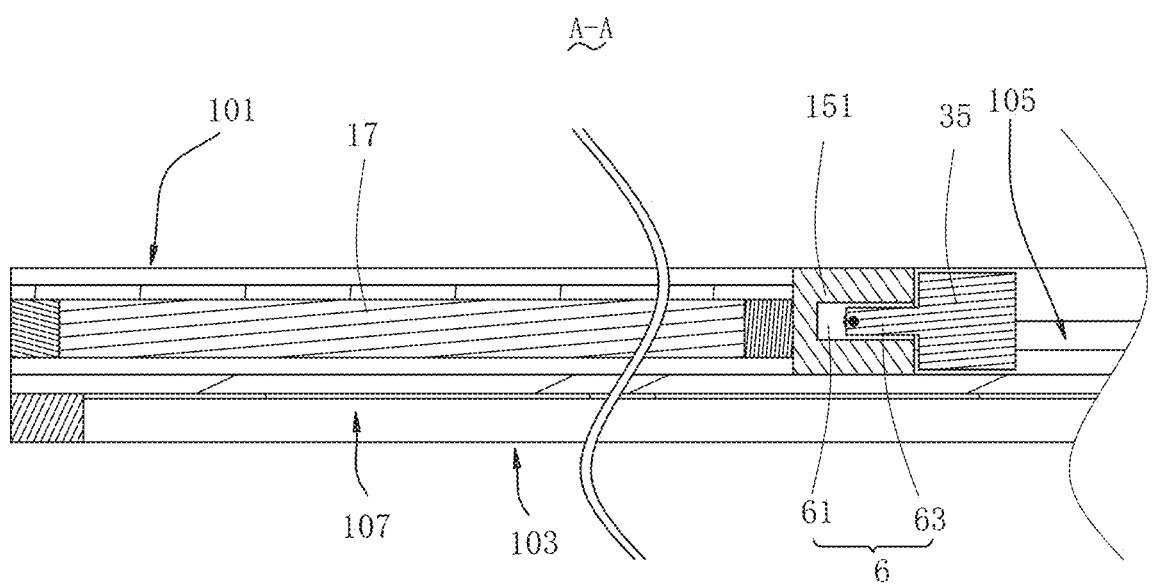
FIG. 9 is a cross-sectional view of the puzzle platform taken along line A-A of FIG. 4.

As shown in FIGS. 3-4, and 9, the center of gravity of the puzzle board 1 is located between the rotating axis 2 and the part where the puzzle board 1 contacts the playing place 20. This ensures the stability of the puzzle board 1 when supported by the kickstand 3. The center of gravity of the puzzle board 1 is located on the self-rotating axis 109 of the puzzle board 1, preventing the puzzle board 1 from deviating due to centrifugal force during self-rotation.

In this embodiment, the rotating device 5 is connected to the puzzle plate 11 through a connecting frame 8 provided in the receiving chamber 150, so that the support surface 51 of the rotating device 5 protrudes from the puzzle board 1. Specifically, the connecting frame 8 is fixedly mounted on the puzzle plate 11, and the rotating device 5 is connected to the connecting frame 8 far away from the puzzle plate 11.

The connecting frame 8 comprises a first connecting part 81 provided along the first direction X and a second connecting part 83 interlaced with the first connecting part 81 along the second direction Y. The first connecting part 81 extends at its two ends along the first direction X to connect with the first reinforcing ribs 151 to enhance the strength of the puzzle board 1. When the kickstand 3 is in the closed position, the extending arms 35 are spaced apart from the first connecting part 81. It can be understood that in other embodiments, the two ends of the first connecting part along the first direction can also be provided spaced apart from the first reinforcing ribs.

It can be understood that in other embodiments, the rotating connection member 6 can also be configured as a hinge, and correspondingly, the kickstand can be connected to the puzzle plate 11 through the rotating connection member.

Figure 10:
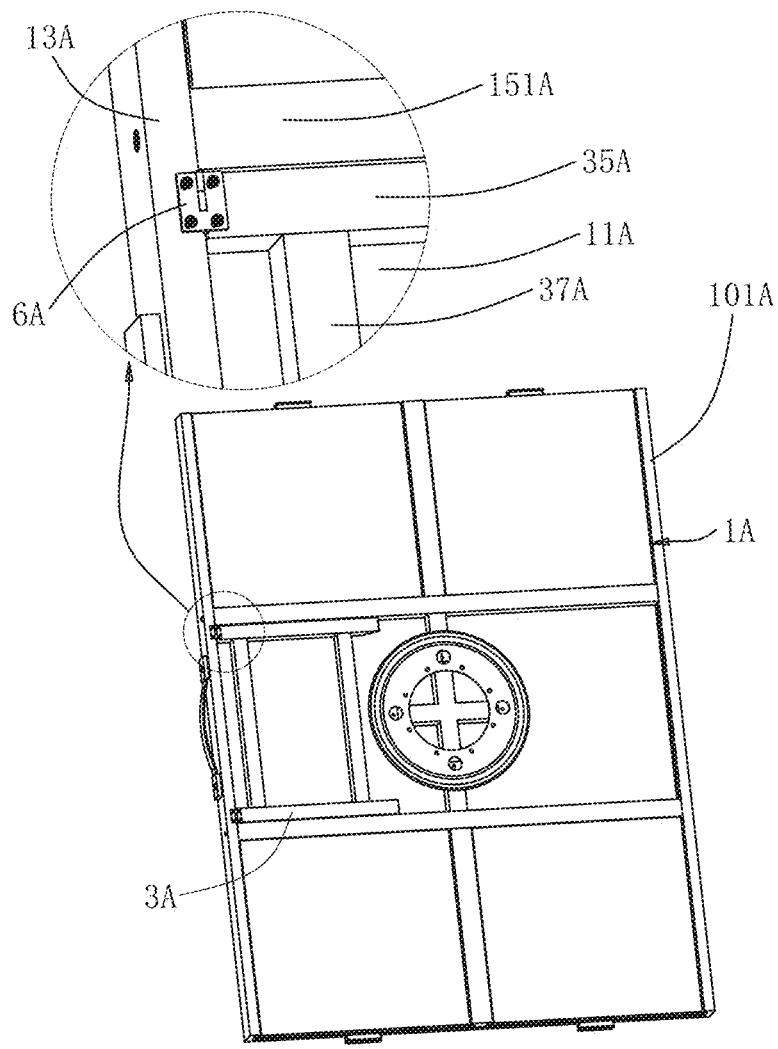
FIG. 10 is an illustrative isometric view of a puzzle platform according to a second embodiment of the present invention, illustrating a kickstand in a closed position.
Figure 11:
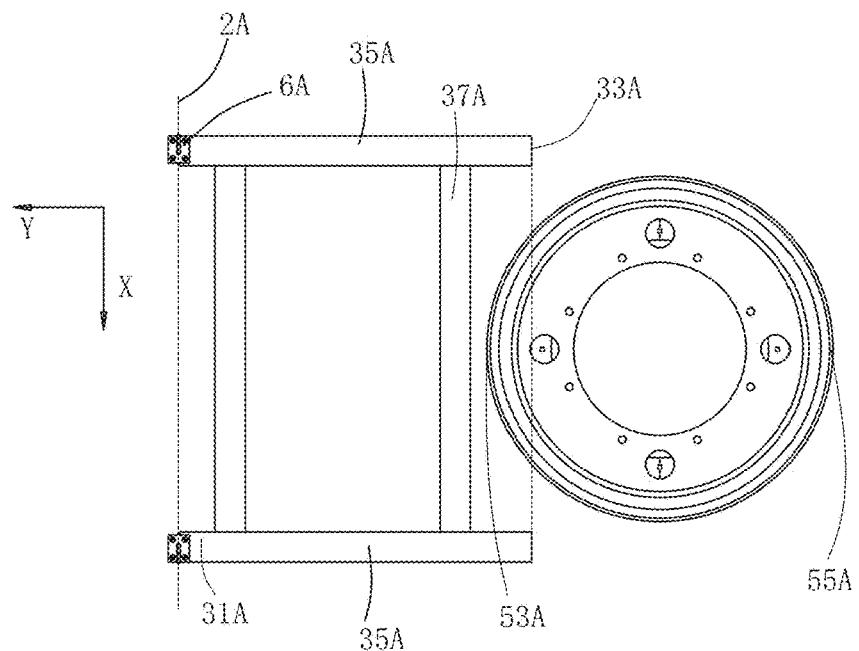
FIG. 11 is an illustrative top plan view of the kickstand, a rotating device and a rotating axis of the puzzle platform of FIG. 10.
Figure 12:
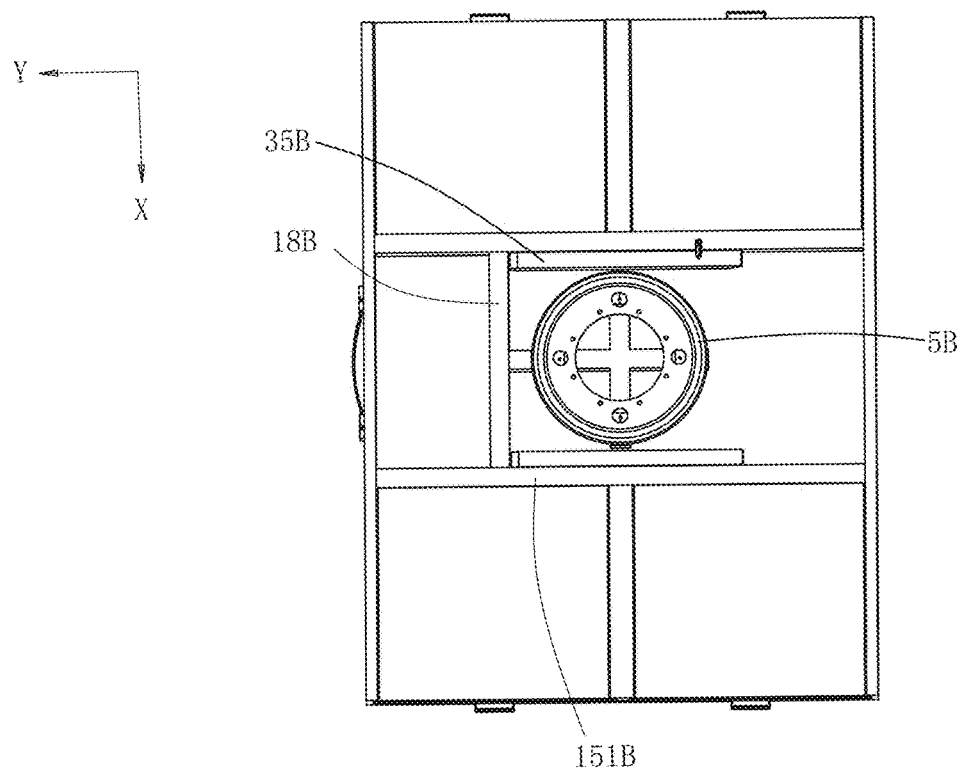
FIG. 12 is an illustrative isometric view of a puzzle platform according to a third embodiment of the present invention, illustrating a kickstand in a closed position.
Figure 13:
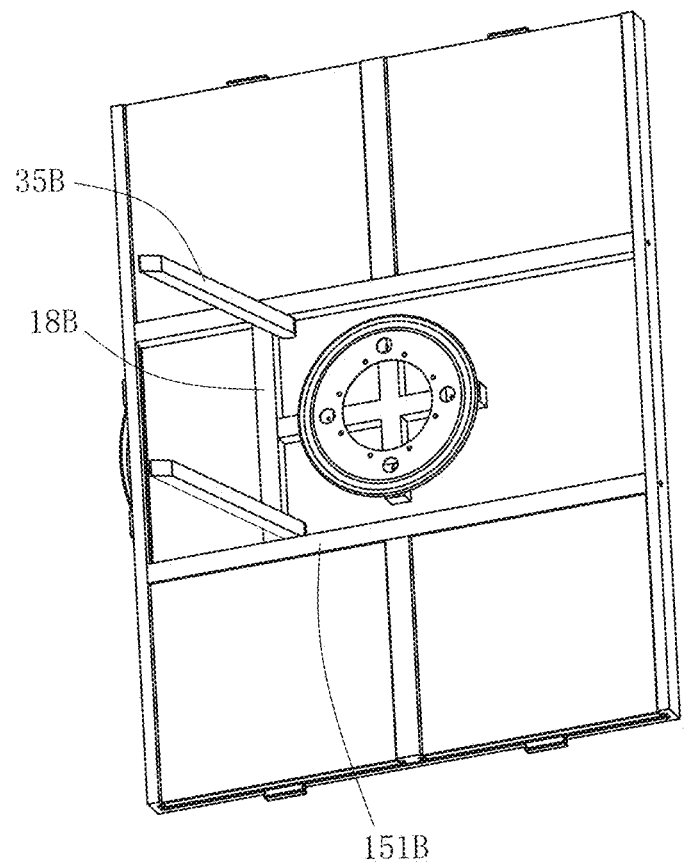
FIG. 13 is an illustrative isometric view of the puzzle platform shown in FIG. 12, illustrating the kickstand in an open position.
Figure 14:
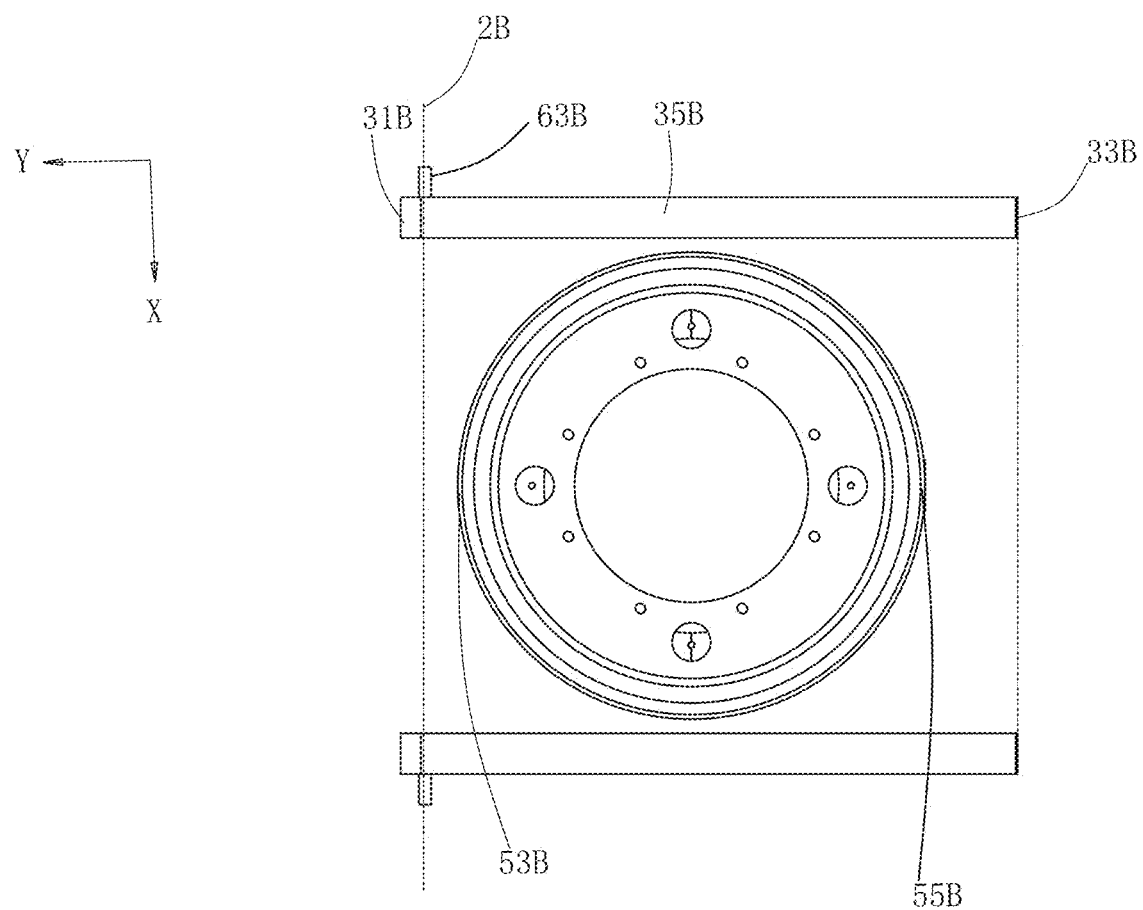
FIG. 14 is an illustrative top plan view of the kickstand, a rotating device and a rotating axis of the puzzle platform of FIG. 12.
Figure 15:
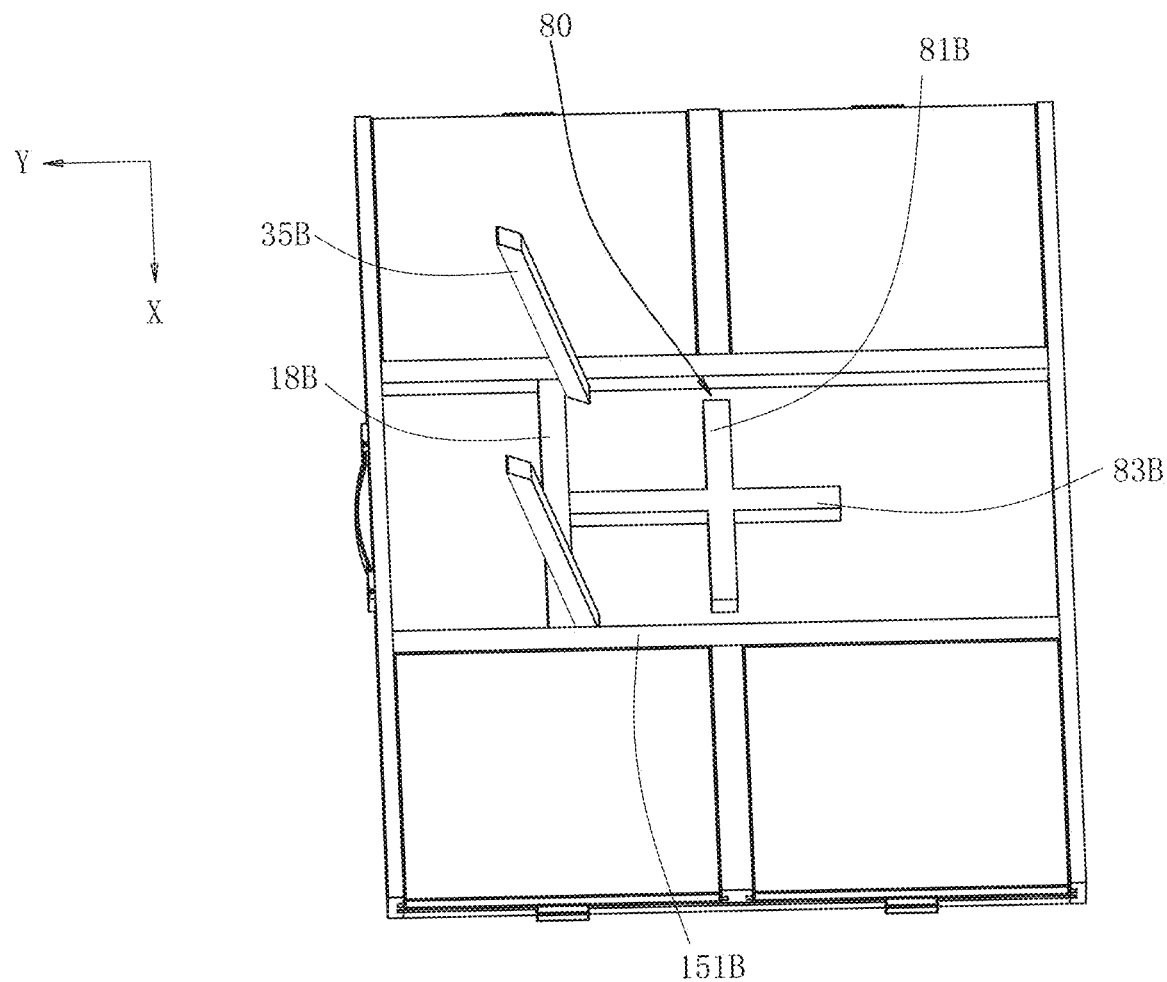
FIG. 15 is an illustrative isometric view of the puzzle platform shown in FIG. 13, with the rotating device removed.

Referring to FIGS. 10-11, a second embodiment is similar to the first embodiment of the present invention except that: the rotating connection member 6A has a preset locking force so that the kickstand 3A can be locked in the closed position and the open position. Therefore, there is no need for the puzzle board to limit the kickstand in the open position, and no need to provide a stopper element on the puzzle board 1A. It can be understood that in other embodiments, the extending wall 13A and the puzzle plate 11A can also be configured to only enclose and form an opening on the first side of the first chamber.

The process of the rotating connection member 6A locking the kickstand 3A in the closed position and the open position is as follows: When the user needs to rotate the kickstand 3A, an external force is applied to the kickstand 3A to act on the rotating connection member 6A. When the torque of this force is greater than the torque of the preset locking force, the kickstand 3A is rotated under this driving force, thereby allowing the kickstand 3A to rotate between the closed position and the open position. When the external force is withdrawn or the torque of the external force is less than the torque of the preset locking force, the rotating connection member 6A cannot rotate because it is in a self-locking state, thereby allowing the kickstand 3A rotated to the closed position to be locked in the closed position and the kickstand 3A rotated to the open position to be locked in the open position.

In this embodiment, the rotating connection member 6A may adopt a self-locking hinge. The rotating axis 2A is the axis of the rotating shaft of the self-locking hinge.

Specifically, a surface of the extending wall 13A arranged on the first side 101A is connected to the rotating connection member 6A, and a side of the extending arm 35A of the kickstand 3A facing away from the puzzle plate 11A is connected to the rotating connection member 6A.

It can be understood that in other embodiments, the kickstand can also be configured to be rotatably connected to the puzzle plate 11A of the puzzle board 1A through the rotating connection member 6A.

Referring to FIGS. 12-15, a third embodiment is similar to the first embodiment of the present invention except that: the far end 55B is closer to the rotating axis 2B than the free end 33B, so that the rotating device 5B is surrounded by the kickstand 3B.

A stopping rib 18B is fixed on the puzzle plate 11B and spaced apart from the extending wall 13B. When the kickstand 3B is in the open position, the extending arm 35B of the kickstand 3B abuts against the stopping rib 18B. Thus, the puzzle board 1B limits the kickstand 3B in the open position.

In this embodiment, the two ends of the stopping rib 18B extend along the first direction X to connect with the first reinforcing ribs 151B, thereby enhancing the strength of the puzzle board 1B. The two ends of the first connecting part 81B along the first direction X are respectively spaced apart from the first reinforcing ribs 151B to form an avoidance groove 80 for avoiding the extending arm 35B. The connecting arm can be omitted.

Figure 16:
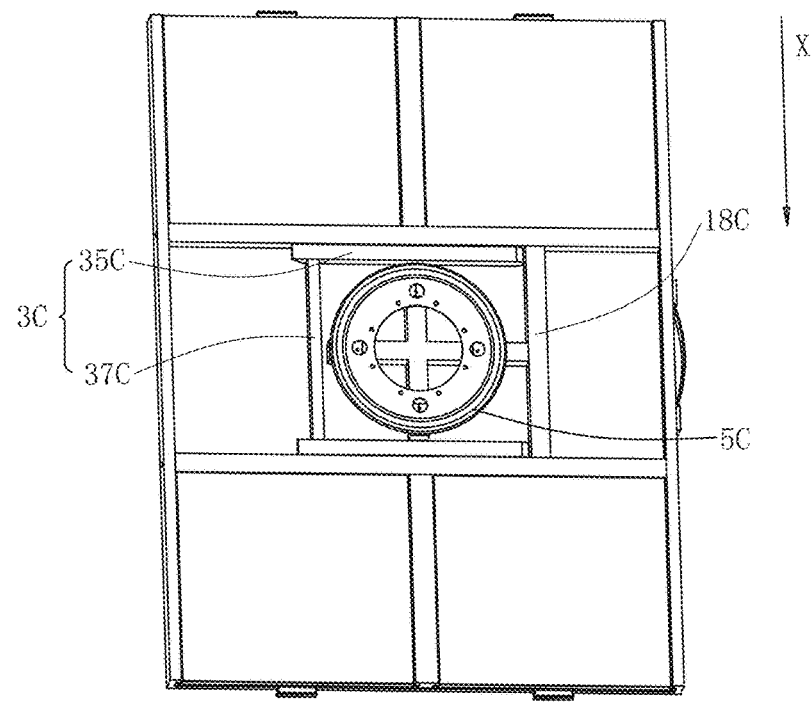
FIG. 16 is an illustrative isometric view of a puzzle platform according to a fourth embodiment of the present invention, illustrating a kickstand in a closed position.
Figure 17:
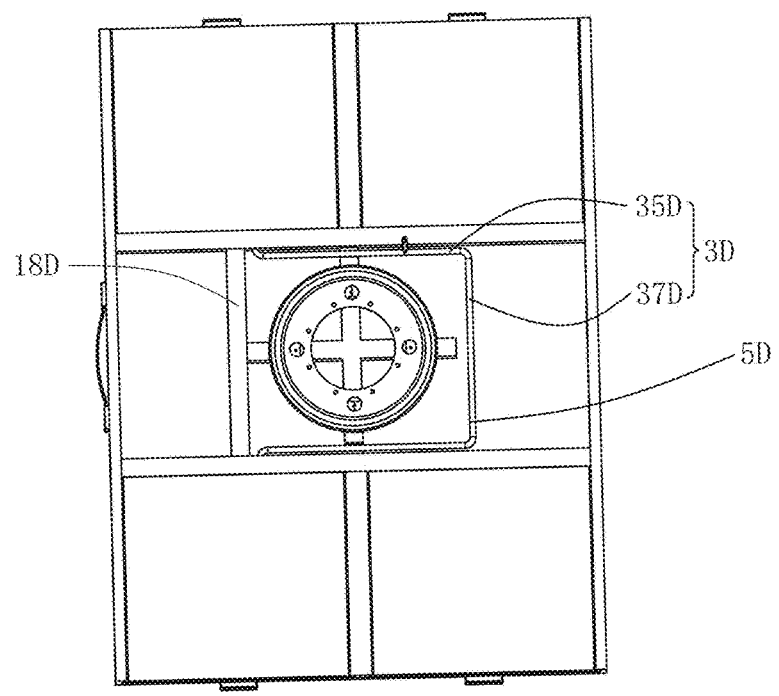
FIG. 17 is an illustrative isometric view of a puzzle platform according to a fifth embodiment of the present invention, illustrating a kickstand in a closed position.
Figure 18:
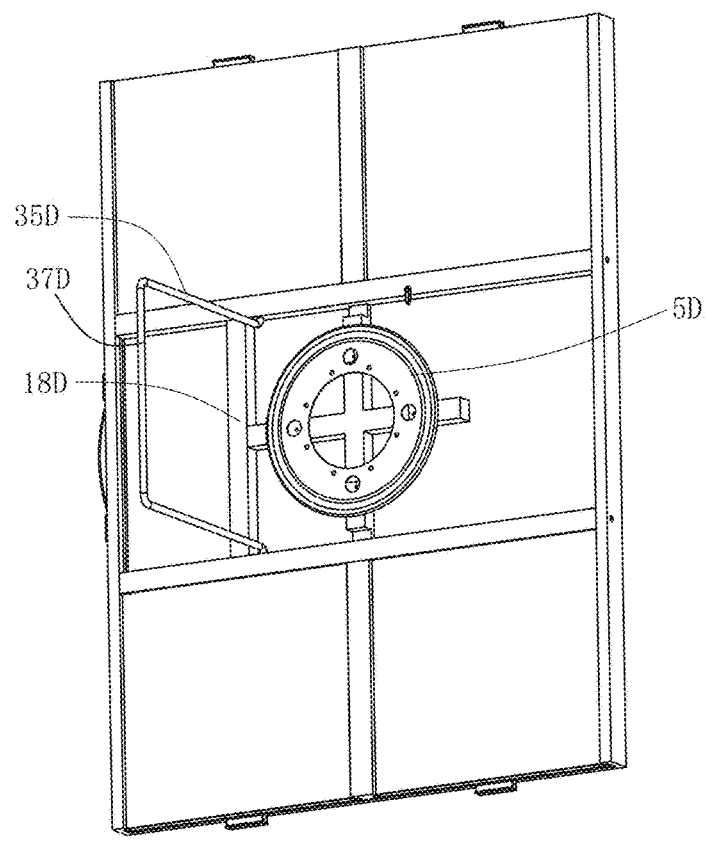
FIG. 18 is an illustrative isometric view of the puzzle platform shown in FIG. 17, illustrating the kickstand in an open position.
Figure 19:
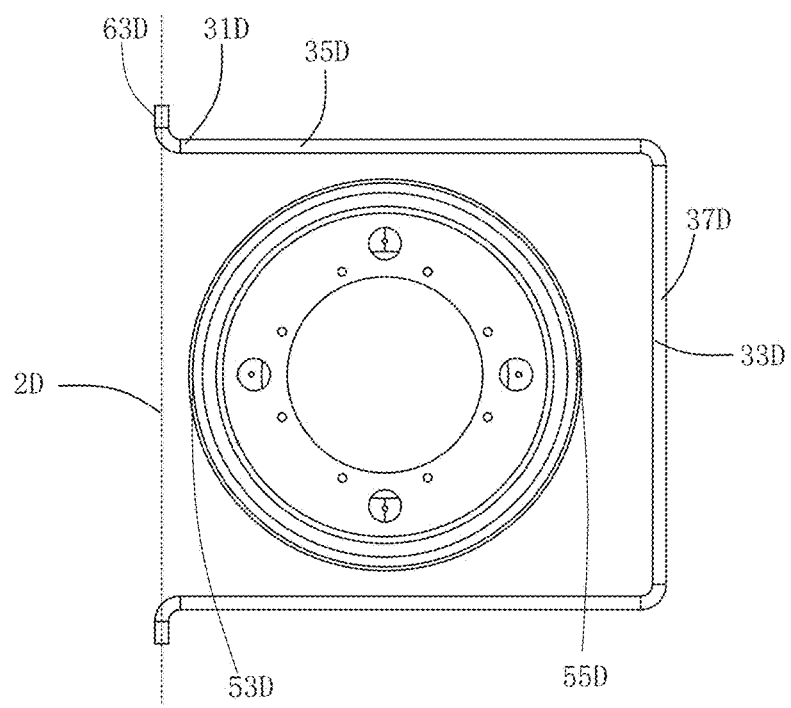
FIG. 19 is an illustrative top plan view of the kickstand, a rotating device and a rotating axis of the puzzle platform of FIG. 18.
Figure 20:
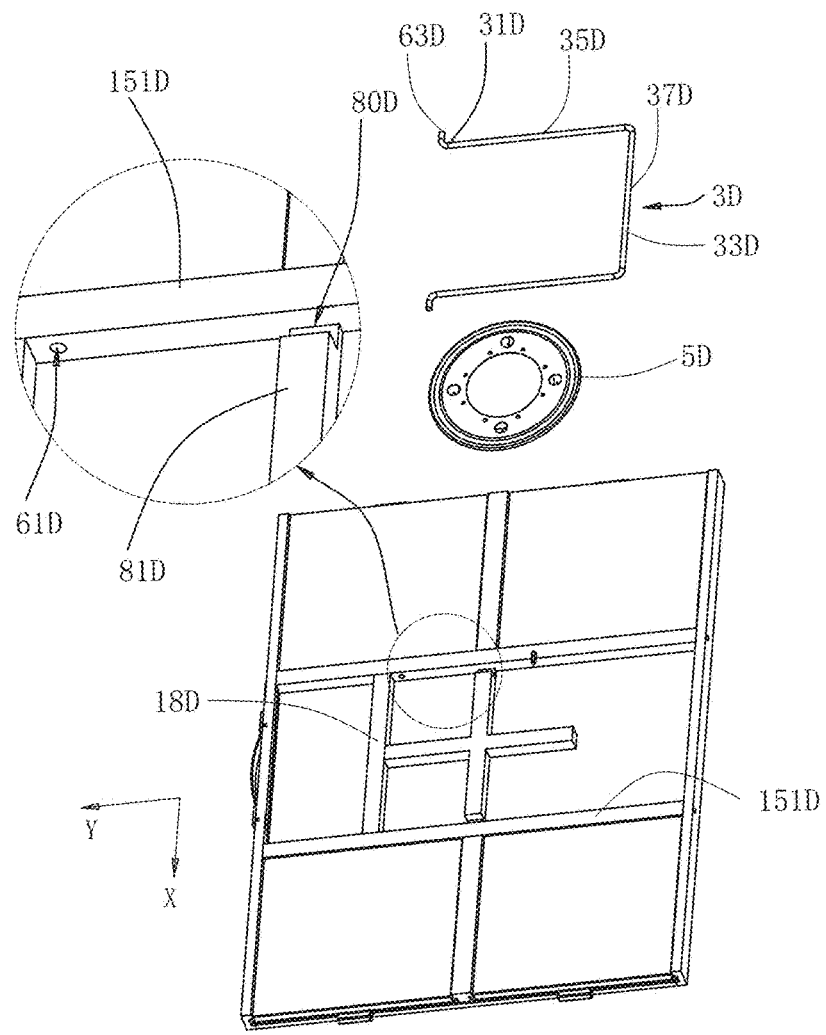
FIG. 20 is a partially exploded perspective view of the puzzle platform shown in FIG. 17.

Referring to FIG. 16, a fourth embodiment is similar to the third embodiment of the present invention except that: the kickstand 3C further comprises a connecting arm 37C. The two ends of the connecting arm 37C extend along the first direction X to connect with the extending arms 35C. The rotating device 5C is located within the area surrounded by the extending arms 35C cooperated with the connecting arm 37C and the stopping rib 18C.

Referring to FIGS. 17-20, a fifth embodiment is similar to the fourth embodiment of the present invention except that: the extending arms 35D and the connecting arm 37D of the kickstand 3D are both metal wires, and the rotating shaft 63D extends from ends of the extending arms 35D away from the connecting arm 37D, with the two rotating shafts 63D being oppositely provided. In other words, the kickstand 3D and the rotating shafts 63D are integrally formed, and correspondingly, the extending arms 35D, the connecting arm 37D, and the rotating shafts 63D can be formed by bending metal wires. The metal wires can be iron wires.

The rotating ends 31D are connection ends between the extending arms 35D and the rotating shafts 63D, and the connecting arm 37D acts as the free end 33D. During installation, an external force is applied to cause a pair of extending arms 35D to move toward each other, thereby producing elastic deformation, so that the rotating shaft 63D can be inserted into the receiving holes 61D.

The two ends of the first connecting part 81D extend to connect with the first reinforcing ribs 151D along the first direction X, thereby enhancing the strength of the puzzle board 1D through the first connecting part 81D. Simultaneously, an avoidance groove 80D for avoiding the extending arm 35D is provided on the first connecting part 81D. It can be understood that in other embodiments, the two ends of the first connecting part along the first direction can also be spaced apart from the first reinforcing rib to form an avoidance groove for avoiding the extending arm.

Figure 21:
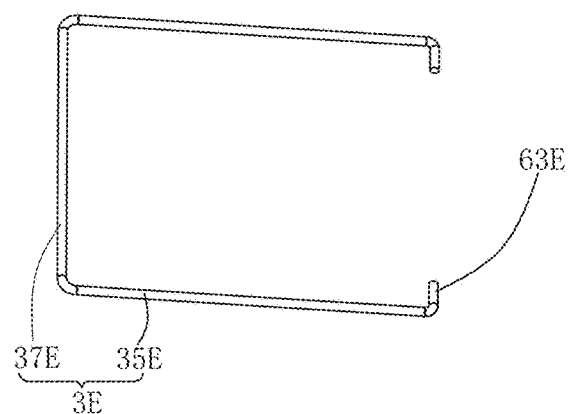
FIG. 21 is an illustrative isometric view of a kickstand of a puzzle platform according to a sixth embodiment of the present invention.
Figure 22:
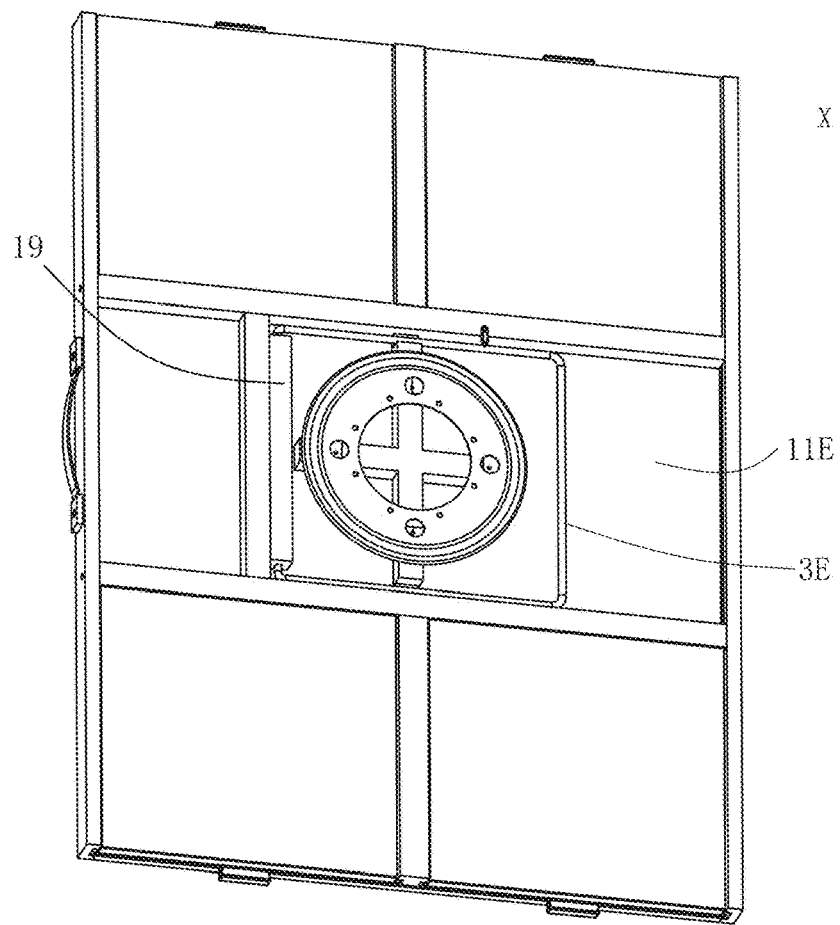
FIG. 22 is an illustrative isometric view of the puzzle platform according to a sixth embodiment of the present invention, illustrating the kickstand in a closed position.
Figure 23:
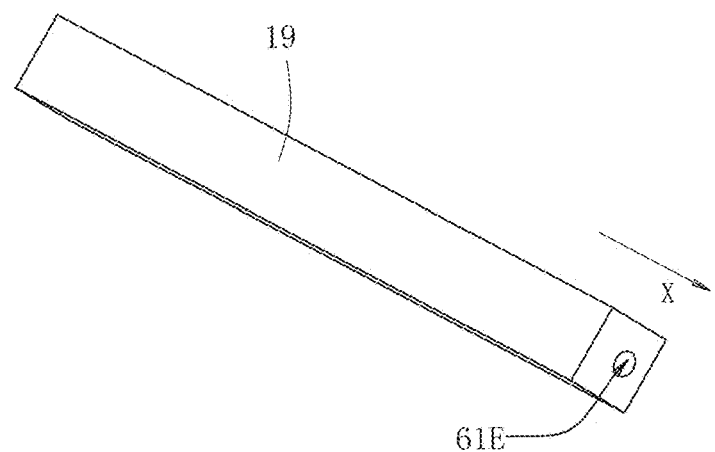
FIG. 23 is an illustrative isometric view of a fixing block of the puzzle platform shown in FIG. 22.

Referring to FIGS. 21-23, a sixth embodiment is similar to the fifth embodiment of the present invention except that: a fixing block 19 is fixedly provided on the puzzle plate 11E, and the kickstand 3E is rotatably connected to the fixing block 19 through the rotating connection member 6E. In other words, the puzzle plate 11E is indirectly connected to the rotating connection member 6E through the fixing block 19.

Specifically, the receiving holes 61E of the rotating connection member 6E are provided at the two ends of the fixing block 19 along the first direction X. The two rotating shafts 63E of the rotating connection member 6E are provided toward each other, and during installation, an external force is applied to cause the pair of extending arms 35E to move in opposite directions, thereby producing elastic deformation, so that the rotating shafts 63E can be inserted into the corresponding receiving hole 61E.

Figure 24:
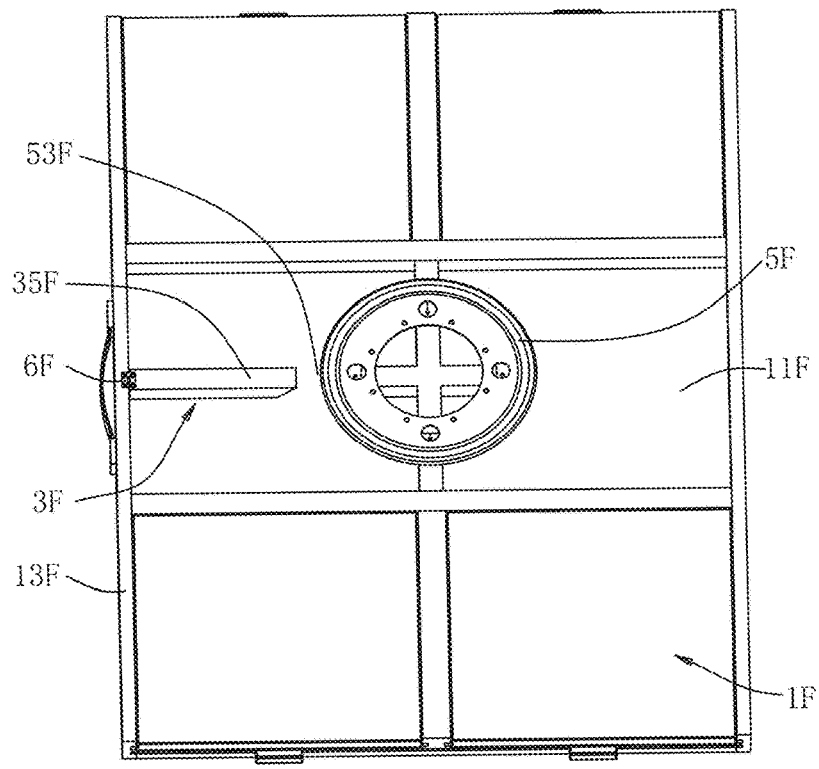
FIG. 24 is an illustrative isometric view of a puzzle platform according to a seventh embodiment of the present invention, illustrating a kickstand in a closed position.
Figure 25:
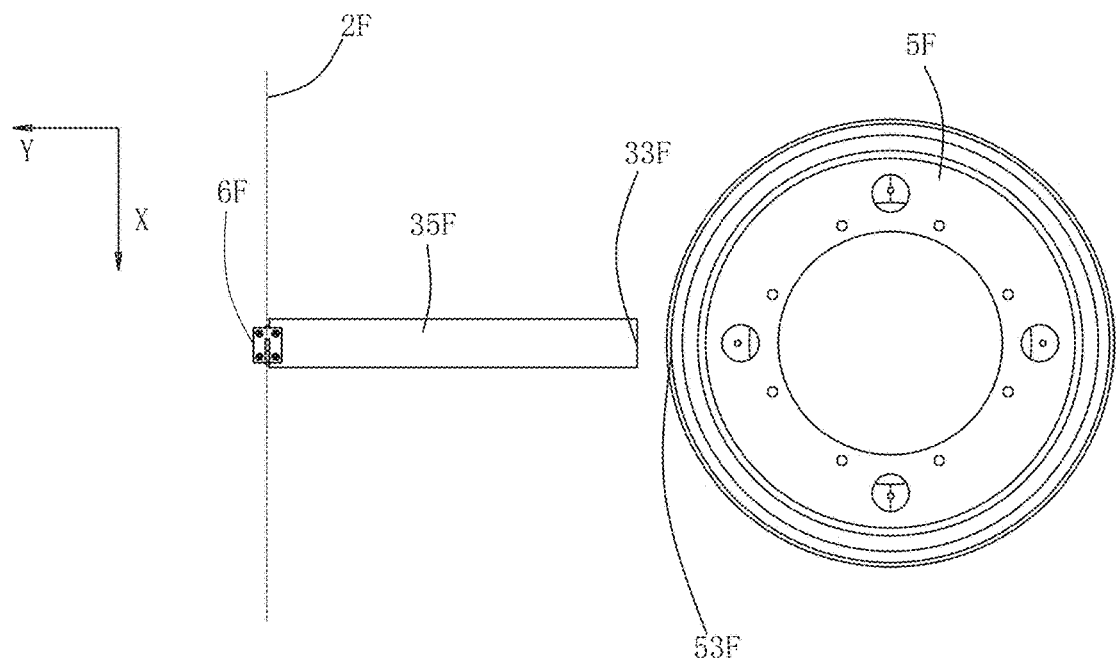
FIG. 25 is an illustrative top plan view of the kickstand, a rotating device and a rotating axis of the puzzle platform of FIG. 24.

Referring to FIGS. 24 and 25, a seventh embodiment is similar to the second embodiment of the present invention except that: the kickstand 3F comprises only one extending arm 35F, and the extending arm 35F is connected to the extending wall 13F of the puzzle board 1F through the rotating connection member 6F.

In this embodiment, the free end 33F of the kickstand 3F is closer to the rotation axis 2F relative to the near end 53F of the rotating device 5F, and the puzzle board 1F is symmetrical about the kickstand 3F. The rotating device 5F is connected to the puzzle board 1F and spaced apart from the kickstand 3F. A plane in which the puzzle plate 11F is located is defined as a projection plane. The projection of the kickstand 3F on the projection plane and the projection of the rotating device 5F on the projection plane do not overlap.

Figure 26:
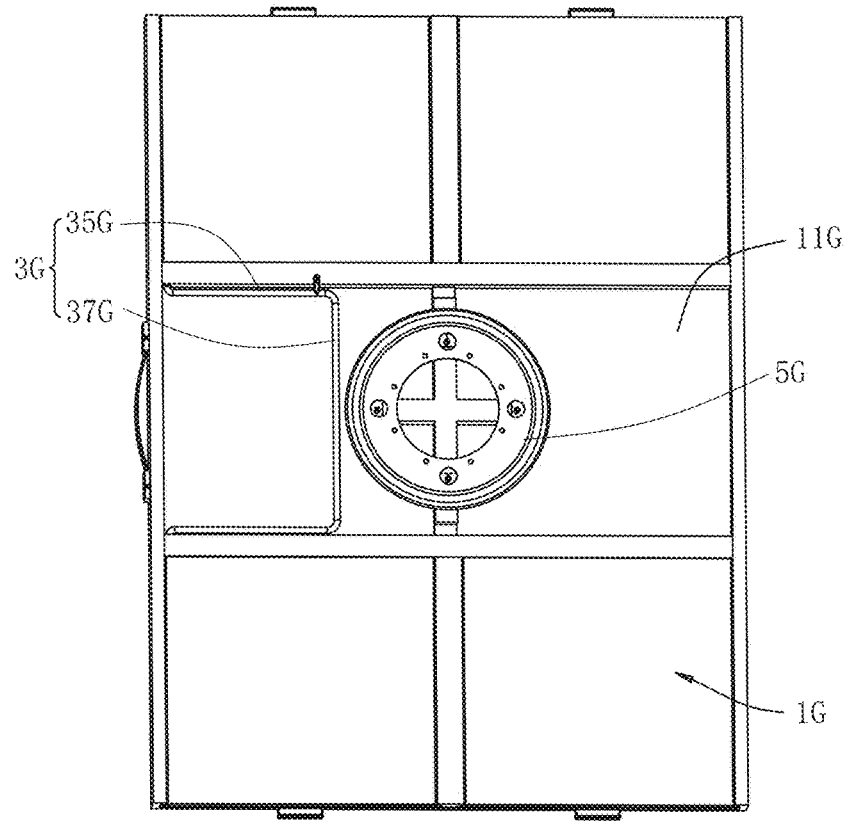
FIG. 26 is an illustrative isometric view of a puzzle platform according to an eighth embodiment of the present invention, illustrating a kickstand in a closed position.
Figure 27:
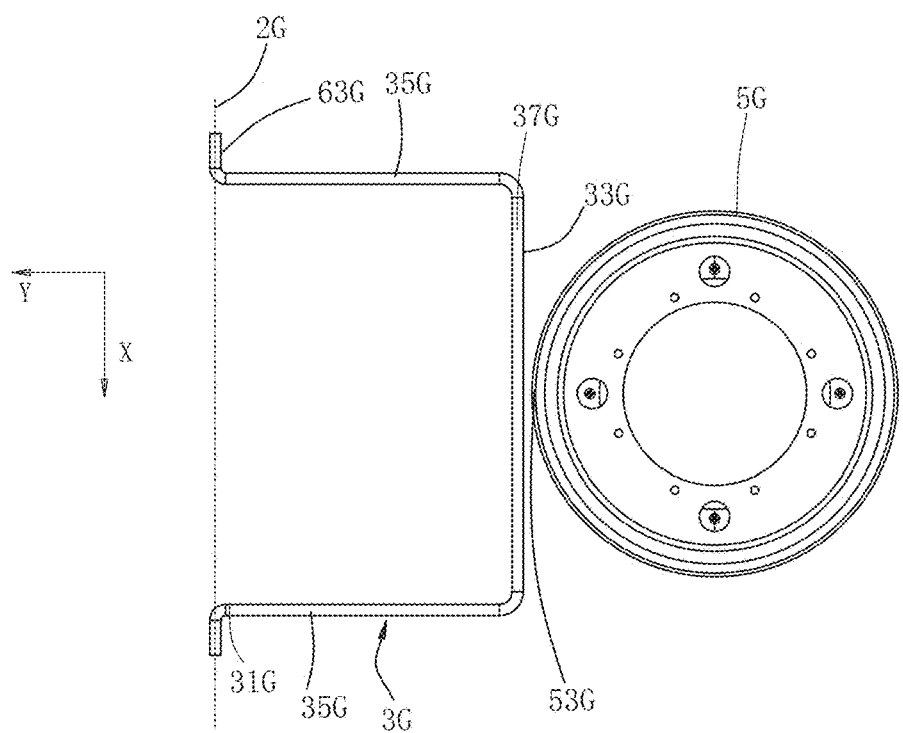
FIG. 27 is an illustrative top plan view of the kickstand, a rotating device and a rotating axis of the puzzle platform of FIG. 26.
Figure 28:
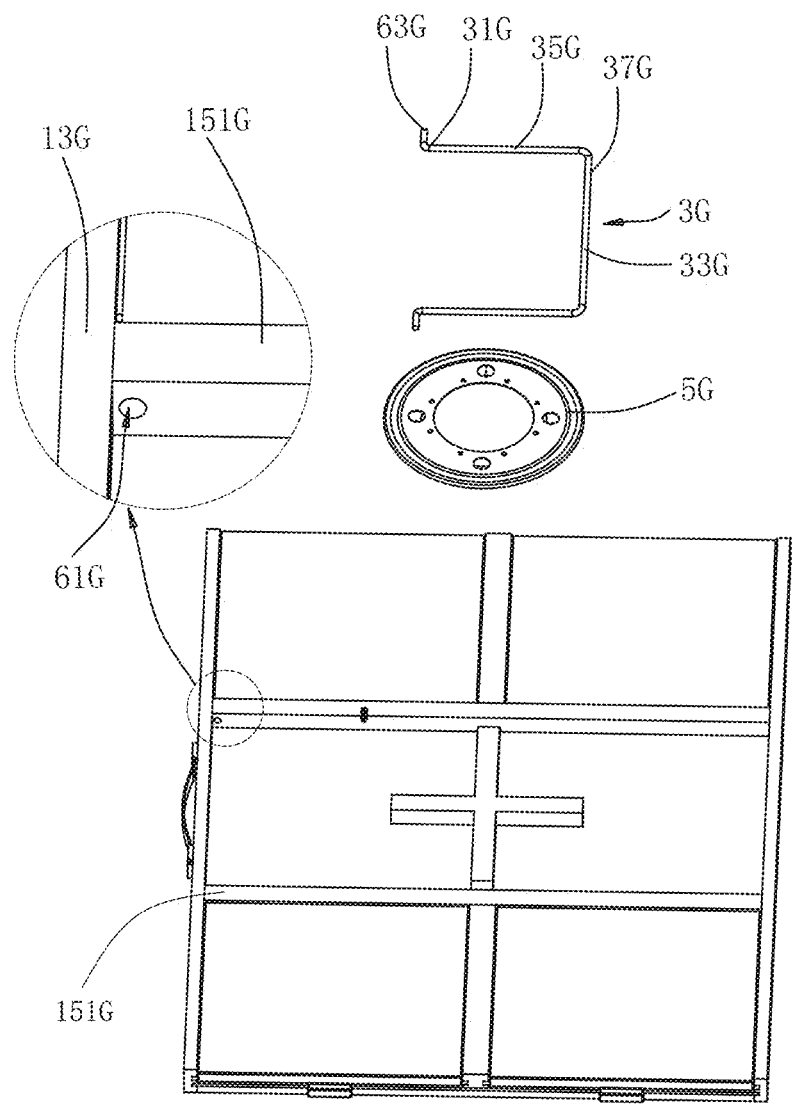
FIG. 28 is a partially exploded perspective view of the puzzle platform shown in FIG. 26.

Referring to FIGS. 26-28, an eighth embodiment is similar to the first embodiment of the present invention except that: the extending arms 35G and the connecting arm 37G of the kickstand 3G are both metal wires, and the rotating shafts 63G extend from ends of the extending arms 35G away from the connecting arm 37G, with the two rotating shafts 63G being oppositely provided. In other words, the kickstand 3G and the rotating shafts 63G are integrally formed, and correspondingly, the extending arms 35G, the connecting arm 37G, and the rotating shafts 63G can be formed by bending metal wires. Metal wires can be iron wires.

The rotating end 31G is the connection end between the extending arms 35G and the rotating shafts 63G, and the connecting arm 37G acts as the free end 33G. During installation, an external force is applied to cause the pair of extending arms 35G to move toward each other, thereby producing elastic deformation, so that the rotating shafts 63G can be inserted into the corresponding receiving holes 61G.

In this embodiment, the free end 33G of the kickstand 3G is closer to the rotation axis 2G than the near end 53G of the rotating device 5G. The rotating device 5G is connected to the puzzle board 1G and spaced apart from the kickstand 3G. A plane in which the puzzle plate 11G is located is defined as a projection plane. The projection of the kickstand 3G on the projection plane and the projection of the rotating device 5G on the projection plane do not overlap.

Figure 29:
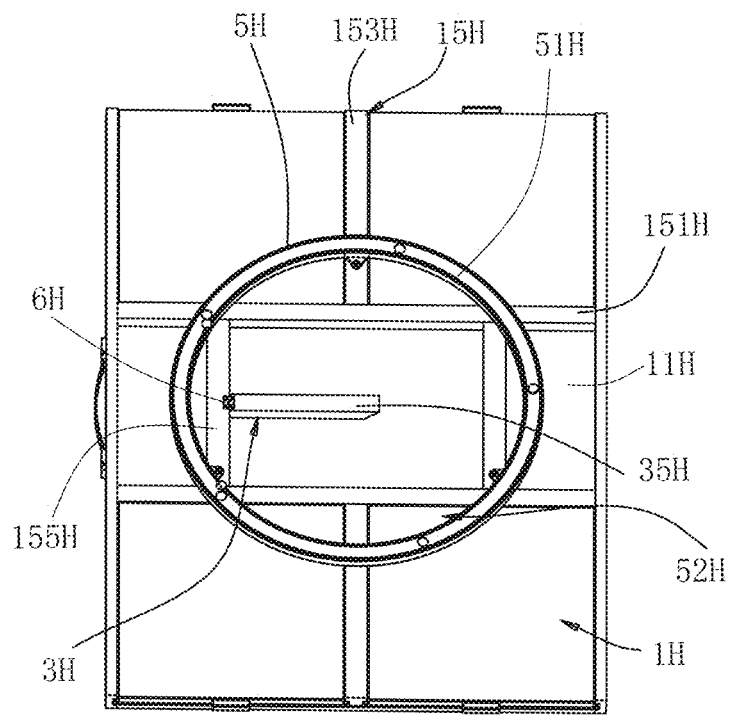
FIG. 29 is an illustrative isometric view of a puzzle platform according to a ninth embodiment of the present invention, illustrating a kickstand in a closed position.
Figure 30:
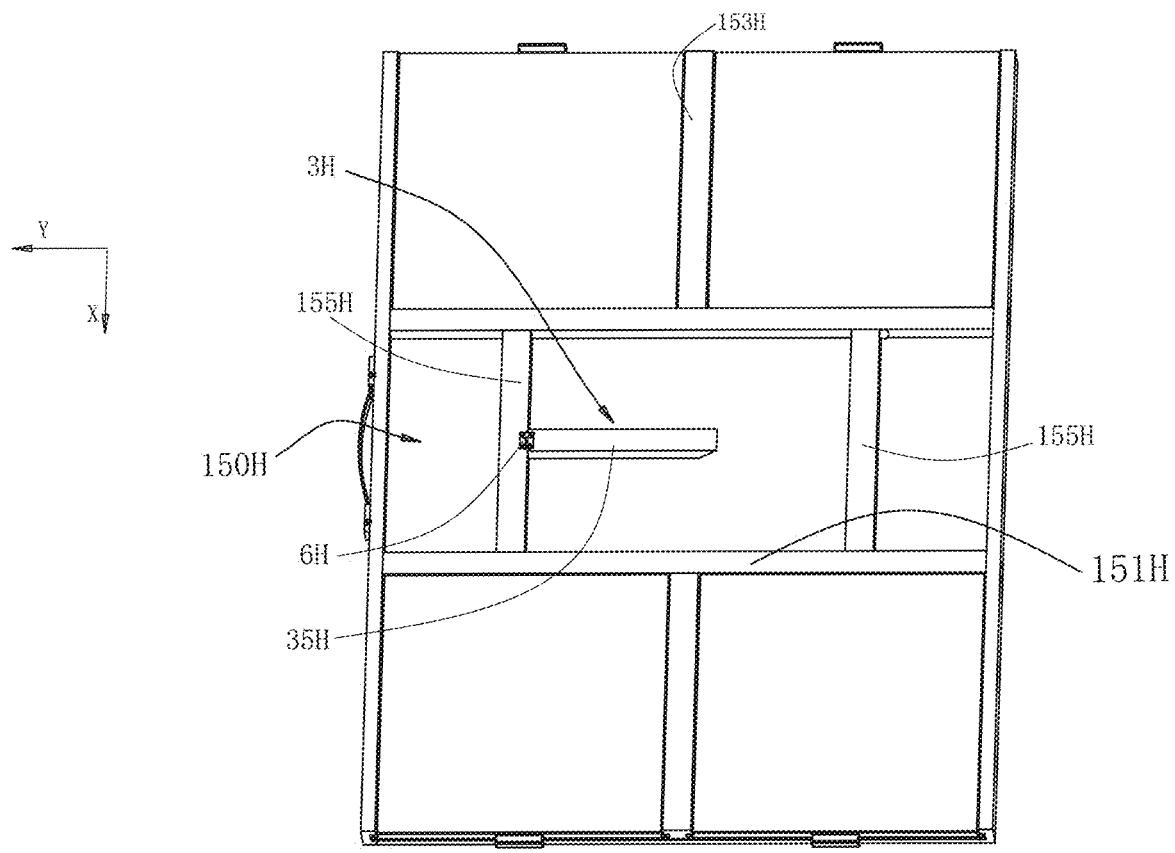
FIG. 30 is an illustrative isometric view of the puzzle platform shown in FIG. 29, with the rotating device removed.

Referring to FIGS. 29 and 30, a ninth embodiment is similar to the second embodiment of the present invention except that: the kickstand 3H is located within a hollow area 52H of the rotating device 5H and opened through the hollow area 52H of the rotating device 5H. The rotating device 5H is connected to the puzzle plate 11H through the reinforcing member 15H, so that the supporting surface 51H of the rotating device 5H protrudes from the puzzle board 1H and a connecting frame can be omitted.

As shown in FIG. 30, the reinforcing member 15H further comprises a pair of third reinforcing ribs 155H spaced apart along the second direction Y. The two ends of each of the third reinforcing ribs 155H along the first direction X extend to connect with the first reinforcing ribs 151H and are received in the receiving chamber 150H. At least one of the first reinforcing ribs 151H, the second reinforcing ribs 153H, and the third reinforcing ribs 155H is/are connected to the rotating device 5H. The kickstand 3H comprises only one extending arm 35H with a strip-shaped profile, and the extending arm 35H is connected to the third reinforcing rib 155H through the rotating connection member 6H.

In this embodiment, the puzzle board 1H is symmetrical about the kickstand 3H. The rotating device 5H is connected to the puzzle board 1H and spaced apart from the kickstand 3H. A plane in which the puzzle plate 11H is located is defined as a projection plane. The projection of the kickstand 3H on the projection plane and the projection of the rotating device 5H on the projection plane do not overlap. The projection of the kickstand 3H on the projection plane falls within the projection range of the rotating device 5H on the projection plane. A diameter of the rotating device 5H is greater than the length of the kickstand 3H.

Figure 31:
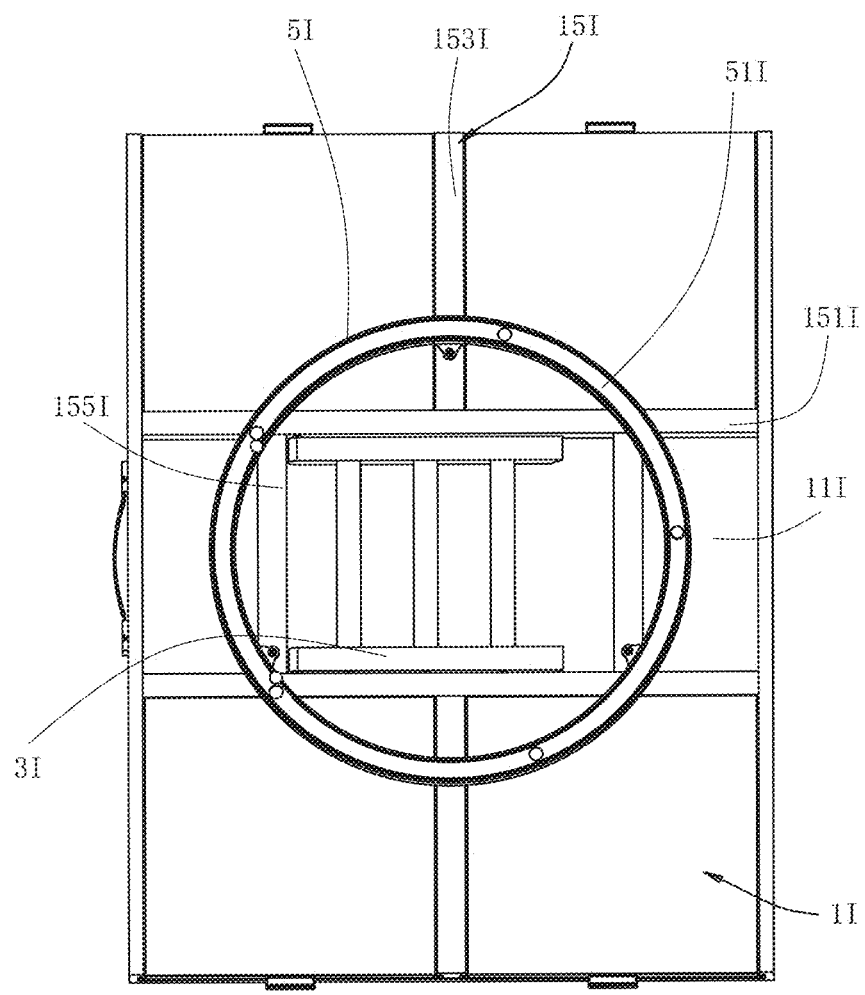
FIG. 31 is an illustrative isometric view of a puzzle platform according to a tenth embodiment of the present invention, illustrating a kickstand in a closed position.
Figure 32:
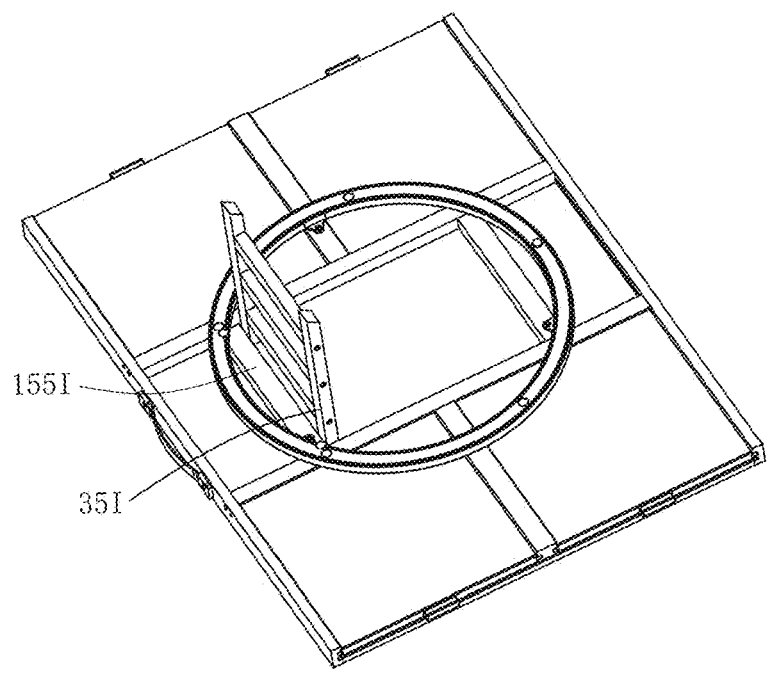
FIG. 32 is an illustrative isometric side view of the puzzle platform shown in FIG. 31, illustrating the kickstand in an open position.
Figure 33:
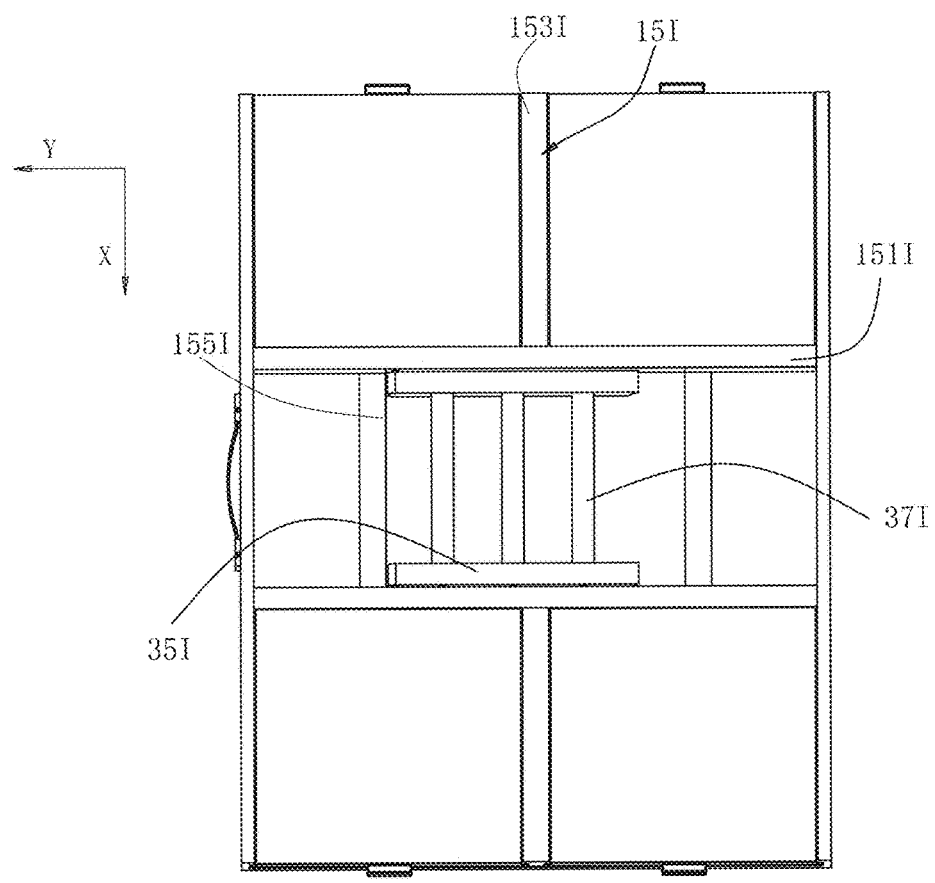
FIG. 33 is an illustrative isometric view of the puzzle platform shown in FIG. 31, with the rotating device removed.

Referring to FIGS. 31-33, a tenth embodiment is similar to the first embodiment of the present invention except that: the kickstand 3H is located within the hollow area of the rotating device 5H.

The rotating device 5I is connected to the puzzle plate 11I via the reinforcing member 15I, so that the supporting surface 51I of the rotating device 5I protrudes from the puzzle board 1I, thereby eliminating the need for a connecting frame.

As shown in FIG. 33, the reinforcing member 15I further comprises a pair of third reinforcing ribs 155I spaced apart along the second direction Y, with the two ends of the third reinforcing ribs 155I along the first direction X extending to connect with the corresponding first reinforcing ribs 151I. At least one of the first reinforcing ribs 151I, the second reinforcing ribs 153I, and the third reinforcing ribs 155I is/are connected to the rotating device 5I.

When the kickstand 3I is rotated to the open position, the extending arms 35I of the kickstand 3I abut against one of the third reinforcing ribs 155I, thereby using the third reinforcing rib 155I to prevent the kickstand 3I from further rotating in the direction away from the closed position, thus allowing the puzzle board 1I to limit the kickstand 3I in the open position.

In this embodiment, the rotating device 5I is connected to the puzzle board 1I and spaced apart from the kickstand 3I. A plane in which the puzzle plate 11I is located is defined as a projection plane. The projection of the kickstand 3I on the projection plane and the projection of the rotating device 5I on the projection plane do not overlap. The projection of the kickstand 3I on the projection plane falls within the range of the projection of the rotating device 5I on the projection plane.

Figure 34:
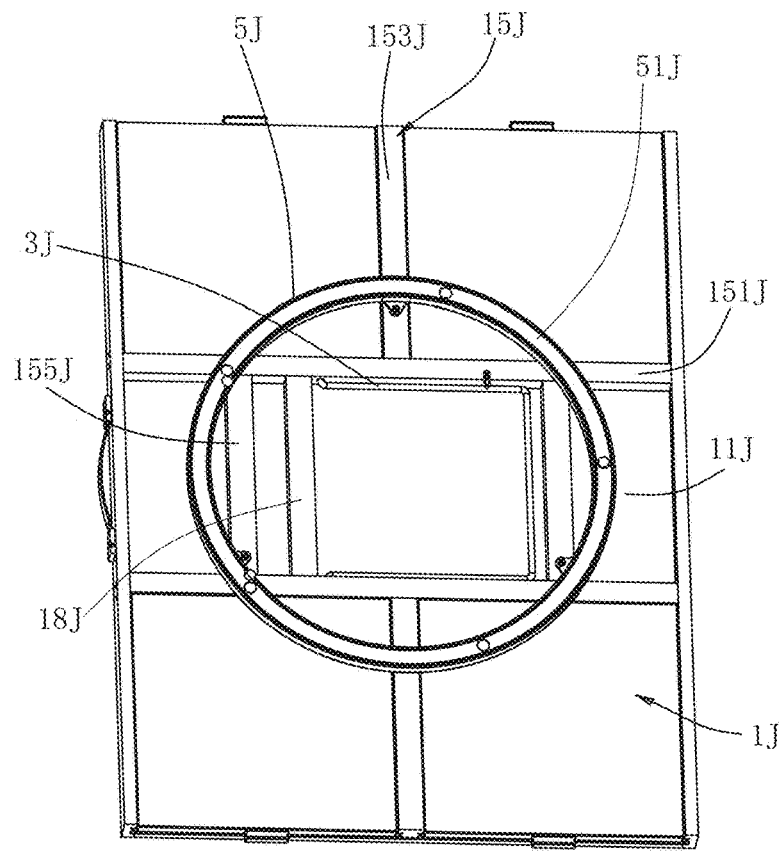
FIG. 34 is an illustrative isometric view of a puzzle platform according to an eleventh embodiment of the present invention, illustrating a kickstand in a closed position.
Figure 35:
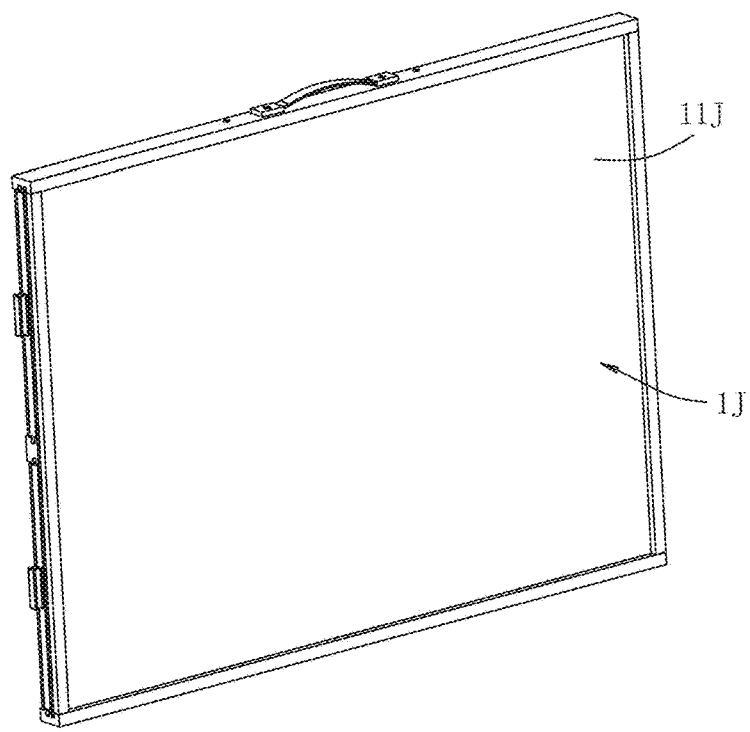
FIG. 35 is an illustrative isometric front view of the puzzle platform shown in FIG. 34.
Figure 36:
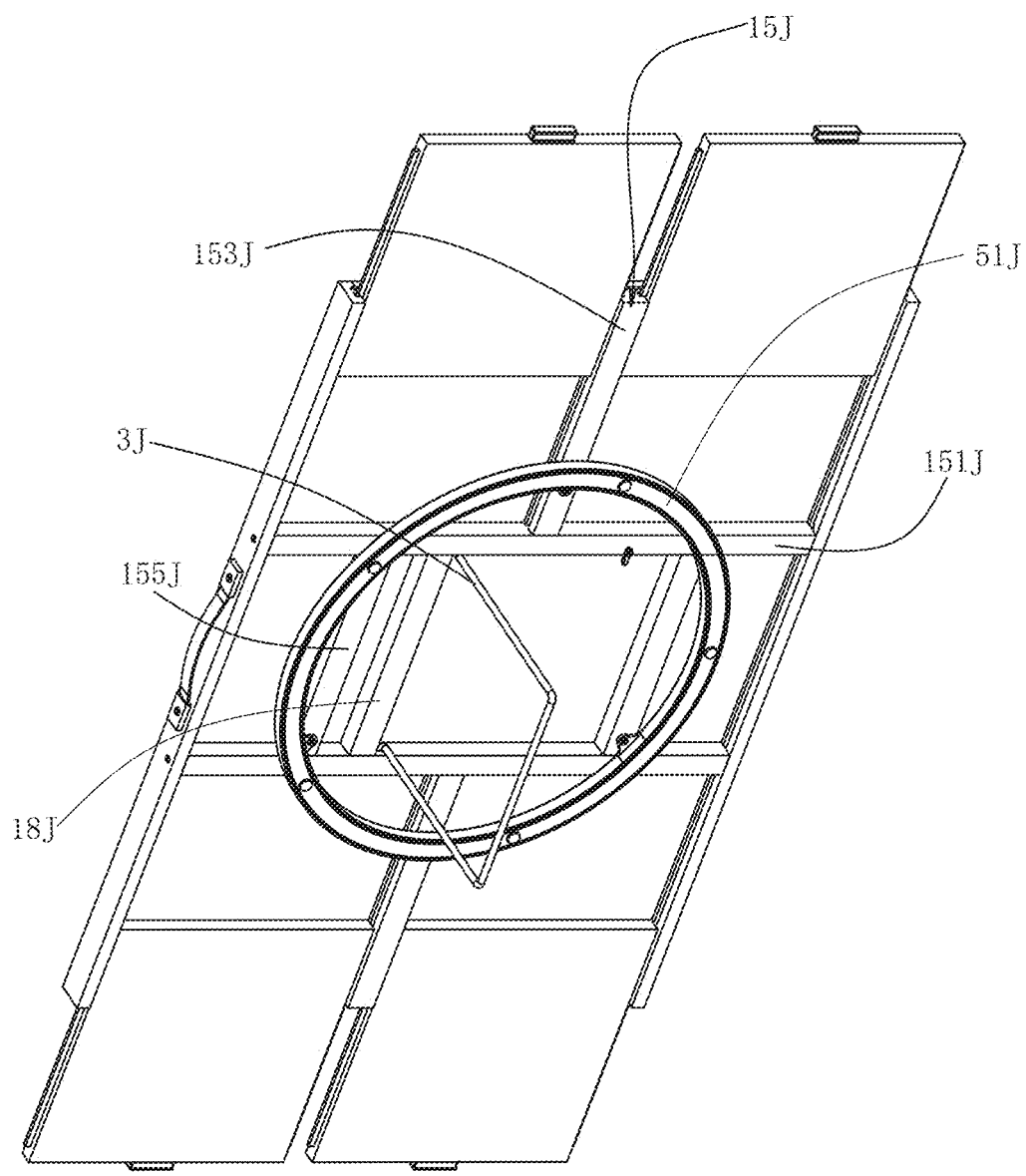
FIG. 36 is an illustrative isometric view of a puzzle platform shown in FIG. 34, illustrating a kickstand in an open position.

Referring to FIGS. 34-36, an eleventh embodiment is similar to the fifth embodiment of the present invention except that: the stopping rib 18J and the kickstand 3J are located within the hollow area of the rotating device 5J. The rotating device 5J is connected to the puzzle plate 11J via the reinforcing member 15J, so that the supporting surface 51J of the rotating device 5J protrudes from the puzzle board 1J, thereby eliminating the need for a connecting frame.

The reinforcing member 15J further comprises a pair of third reinforcing ribs 155J spaced apart along the second direction Y, with the two ends of each of the third reinforcing ribs 155J along the first direction X extending to connect with the first reinforcing ribs 151J. At least one of the first reinforcing ribs 151J, the second reinforcing ribs 153J, and the third reinforcing ribs 155J is/are connected to the rotating device 5J. The third reinforcing ribs 155J is spaced apart from the stopping rib 18J. The kickstand 3J is coupled with the first reinforcing ribs 151J.

In this embodiment, the rotating device 5J is connected to the puzzle board 1J and spaced apart from the kickstand 3J. A plane in which the puzzle plate 11J is located is defined as a projection plane. The projection of the kickstand 3J on the projection plane and the projection of the rotating device 5J on the projection plane do not overlap. The projection of the kickstand 3J on the projection plane falls within the range of the projection of the rotating device 5J on the projection plane.

Figure 37:
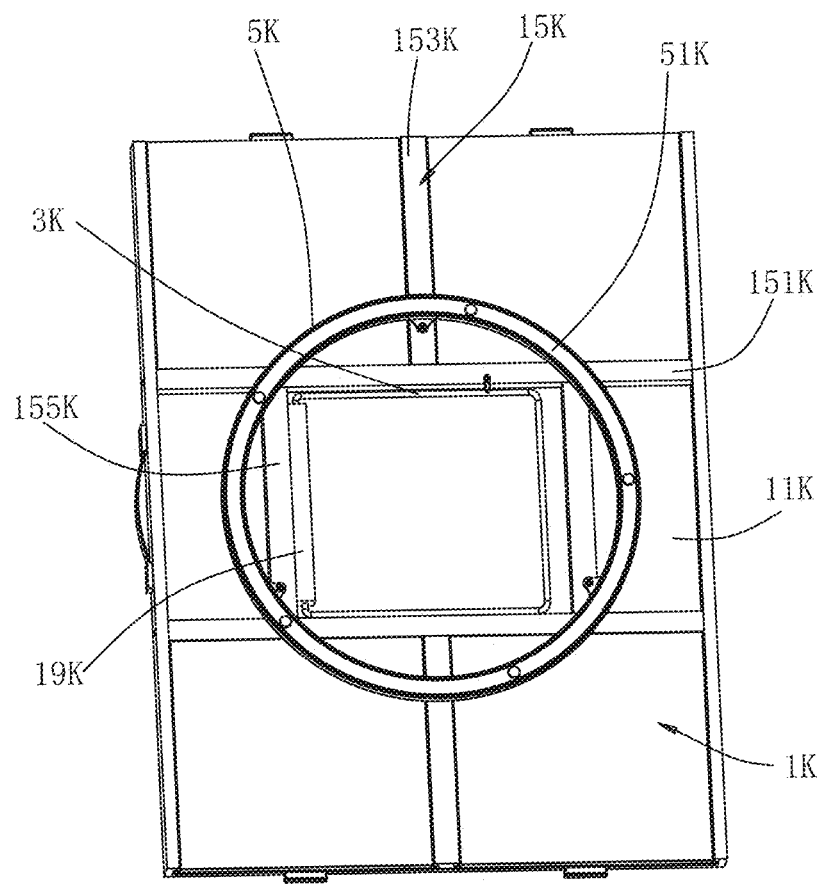
FIG. 37 is an illustrative isometric view of a puzzle platform according to a twelfth embodiment of the present invention, illustrating a kickstand in a closed position.

Referring to FIG. 37, a twelfth embodiment is similar to the sixth embodiment of the present invention except that: the fixing block 19K and the kickstand 3K are located within the hollow area of the rotating device 5K. The rotating device 5K is connected to the puzzle plate 11K via the reinforcing member 15K, so that the supporting surface 51K of the rotating device 5K protrudes from the puzzle board 1K, thereby eliminating the need for a connecting frame.

The reinforcing member 15K further comprises a pair of third reinforcing ribs 155K spaced apart along the second direction Y, with the two ends of each of the third reinforcing ribs 155K along the first direction X extending to connect with the first reinforcing ribs 151K. At least one of the first reinforcing ribs 151K, the second reinforcing ribs 153K, and the third reinforcing ribs 155K is/are connected to the rotating device 5K.

When the kickstand 3K is rotated to the open position, it abuts against one of the third reinforcing ribs 155K, thereby using the third reinforcing rib 155K to prevent the kickstand 3K from further rotating in the direction away from the closed position, thus achieving the purpose of limiting the kickstand 3K in the open position. Therefore, there is no need to set a stopping rib.

In this embodiment, the rotating device 5K is connected to the puzzle board 1K and spaced apart from the kickstand 3K. A plane in which the puzzle plate 11K is located is defined as a projection plane. The projection of the kickstand 3K on the projection plane and the projection of the rotating device 5K on the projection plane do not overlap. The projection of the kickstand 3K on the projection plane falls within the range of the projection of the rotating device 5K on the projection plane.

Figure 38:
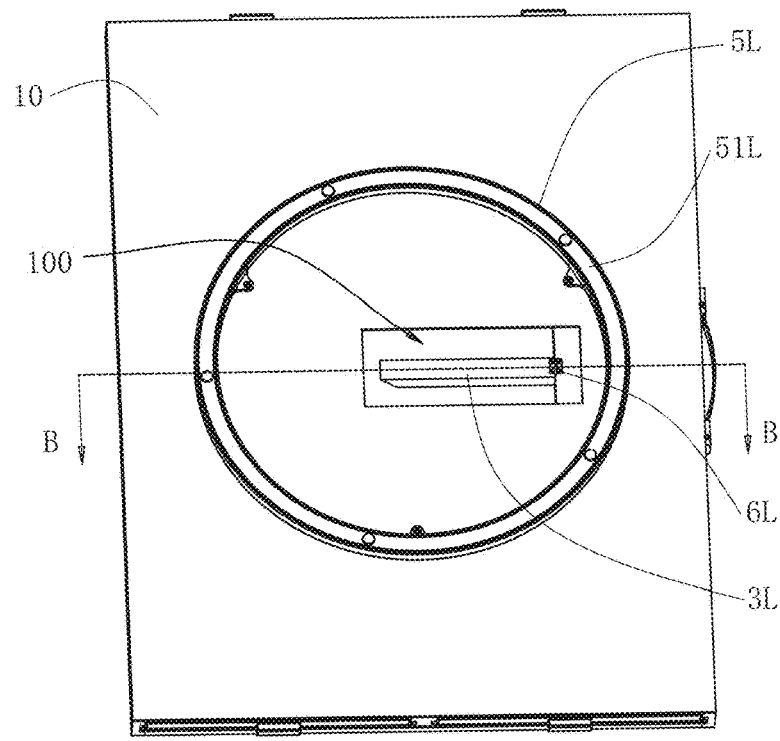
FIG. 38 is an illustrative isometric view of a puzzle platform according to a thirteenth embodiment of the present invention, illustrating a kickstand in a closed position.
Figure 39:
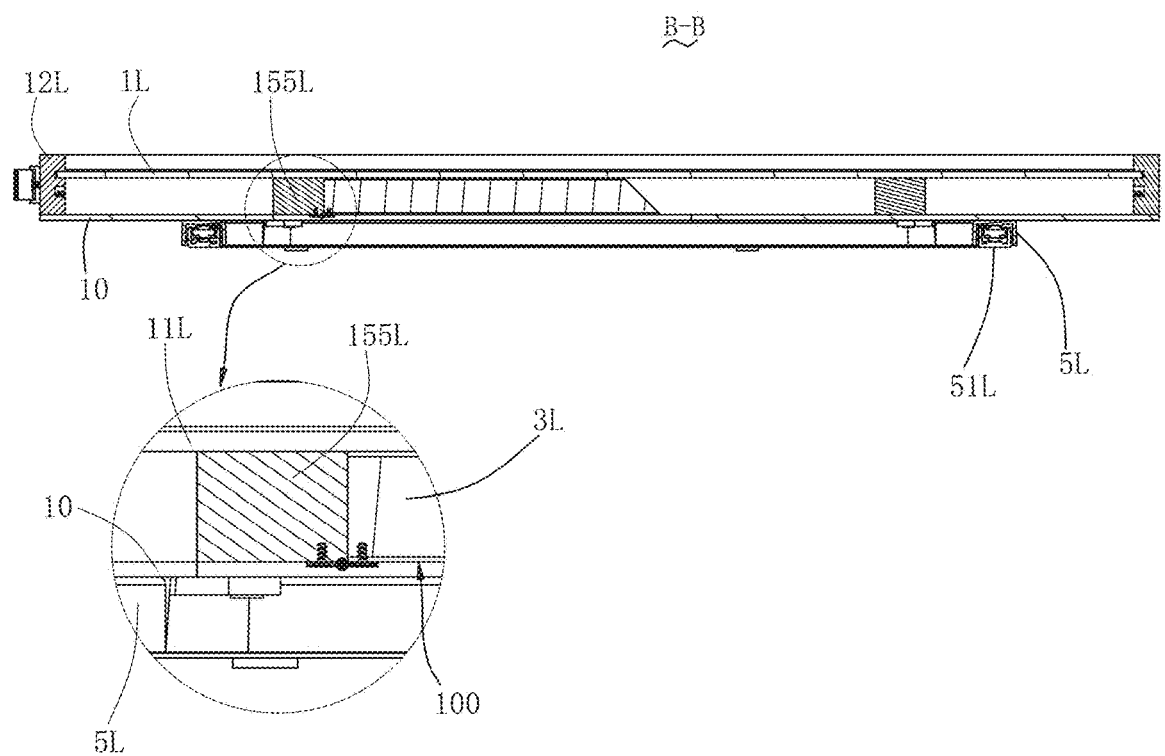
FIG. 39 is a cross-sectional view of the puzzle platform taken along line B-B of FIG. 38.

Referring to FIGS. 38 and 39, a thirteenth embodiment is similar to the seventh embodiment of the present invention except that: the puzzle board 1L further comprises a bottom plate 10 fixed on the side of the supporting frame 12L away from the puzzle plate 11L. The bottom plate 10 can further enhance the strength of the puzzle board 1L.

The rotating device 5L is fixed on the side of the bottom plate 10 away from the supporting frame 12L, so that the supporting surface 51L of the rotating device 5L protrudes from the puzzle board 1L.

The bottom plate 10 has a window 100 that exposes the kickstand 3L and the rotating connecting member 6L, and the kickstand 3L can freely pass through window 100 during rotation.

In this embodiment, the rotating device 5L is connected to the puzzle board 1L and spaced apart from the kickstand 3L. A plane in which the puzzle plate 11L is located is defined as a projection plane. The projection of the kickstand 3L on the projection plane and the projection of the rotating device 5L on the projection plane do not overlap. The projection of the kickstand 3L on the projection plane falls within the range of the projection of the rotating device 5L on the projection plane.

Figure 40:
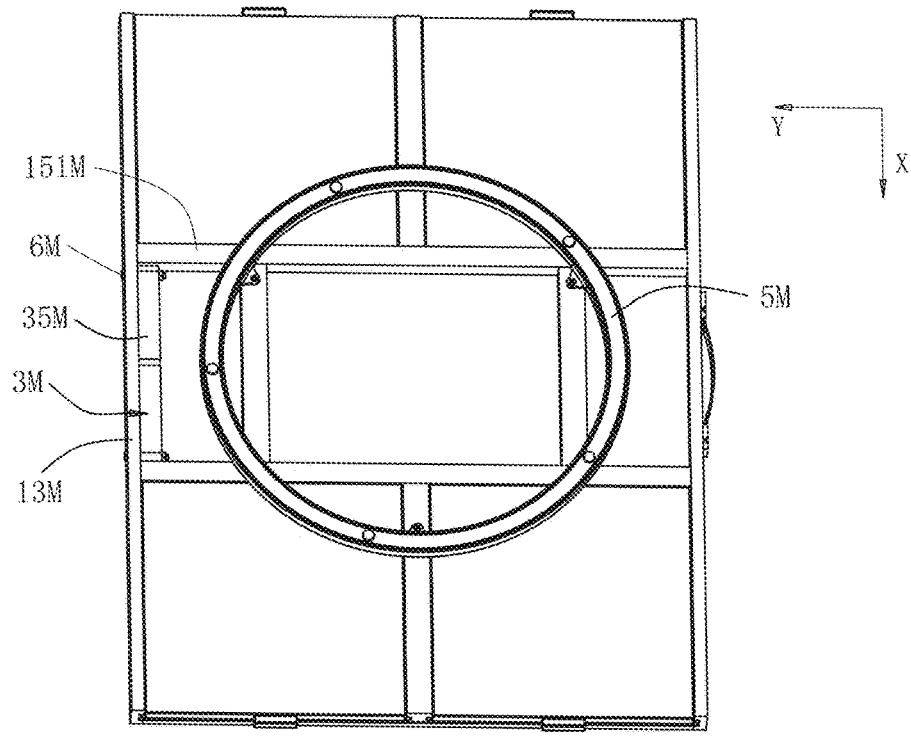
FIG. 40 is an illustrative isometric view of a puzzle platform according to a fourteenth embodiment of the present invention, illustrating a kickstand in a closed position.
Figure 41:
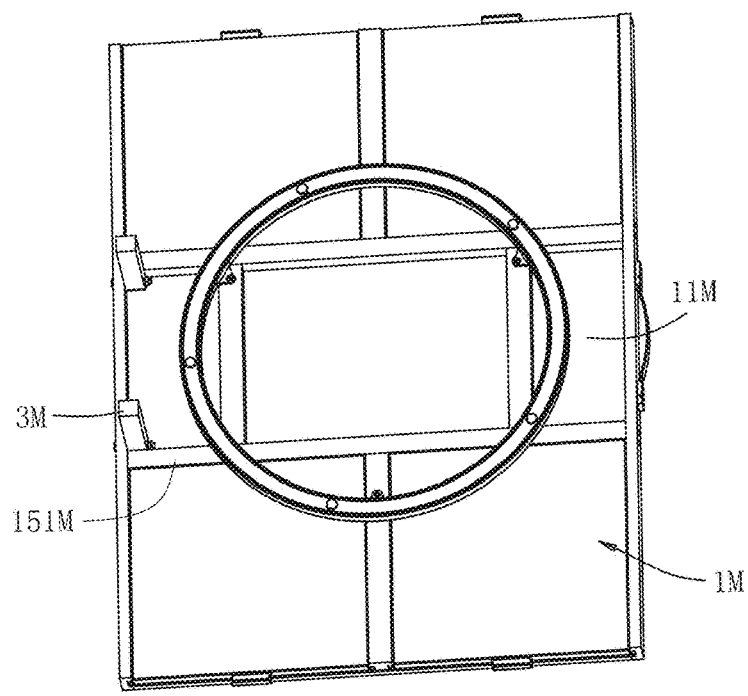
FIG. 41 is an illustrative isometric side view of the puzzle platform shown in FIG. 40, illustrating the kickstand in an open position.
Figure 42:
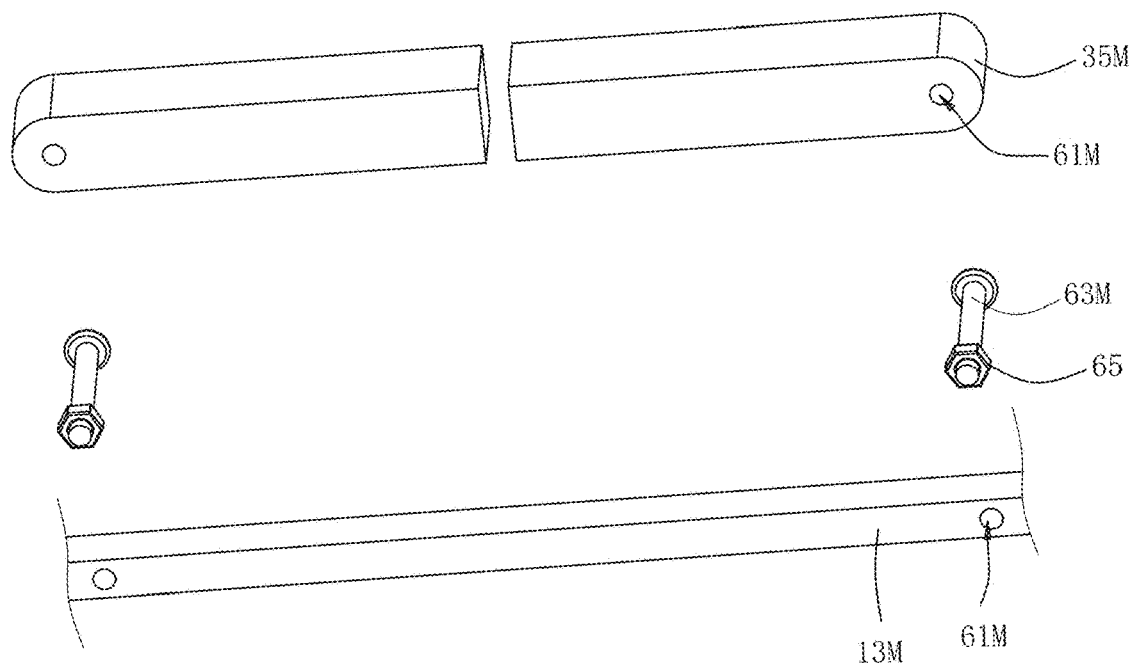
FIG. 42 is a partially exploded perspective view of a rotating connecting member of the puzzle platform shown in FIG. 40.

Referring to FIGS. 40-42, a fourteenth embodiment is similar to the ninth embodiment of the present invention except that: the kickstand 3M consists of a pair of extending arms 35M spaced apart along the first direction X. The extending arms 35M extend along the first direction X, and are spaced apart from the rotating device 5M along the second direction Y. The extending arms 35M are connected to the extending wall 13M via the rotating connecting member 6M.

As shown in FIG. 42, the rotating connecting member 6M comprises receiving holes 61M and a rotating shaft 63M inserted into the corresponding receiving hole 61M. The extending arm 35M and the extending wall 13M both have receiving holes 61M. The rotating shaft 63M is a bolt, and the other end of the rotating shaft 63M passes through the nut 65 to limit its displacement in the second direction Y.

As shown in FIG. 41, when the kickstand 3M is rotated to the open position, the kickstand 3M abuts against the first reinforcing ribs 151M. Thus, the first reinforcing ribs 151M prevents the kickstand 3M from further rotating in the direction away from the closed position.

It can be understood that, in other embodiments, the kickstand 3M can further be configured to include only one extending arm 35M, or the kickstand 3M can be connected to the first reinforcing rib 151M via a rotating connecting member (e.g., a self-locking hinge) with a preset locking force.

In this embodiment, the rotating device 5M is connected to the puzzle board 1M and spaced apart from the kickstand 3M. A plane in which the puzzle plate 11H is located is defined as a projection plane. The projection of the kickstand 3M on the projection plane and the projection of the rotating device 5M on the projection plane do not overlap.

Figure 43:
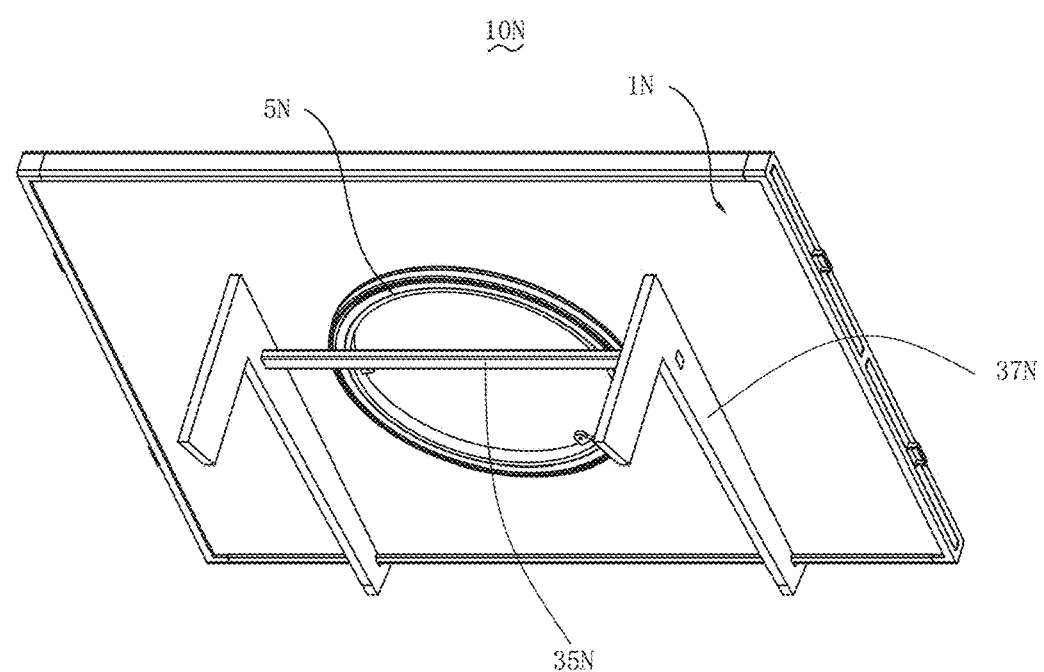
FIG. 43 is an illustrative isometric view of a puzzle platform according to a fifteenth embodiment of the present invention, illustrating a kickstand being in an open position.
Figure 44:
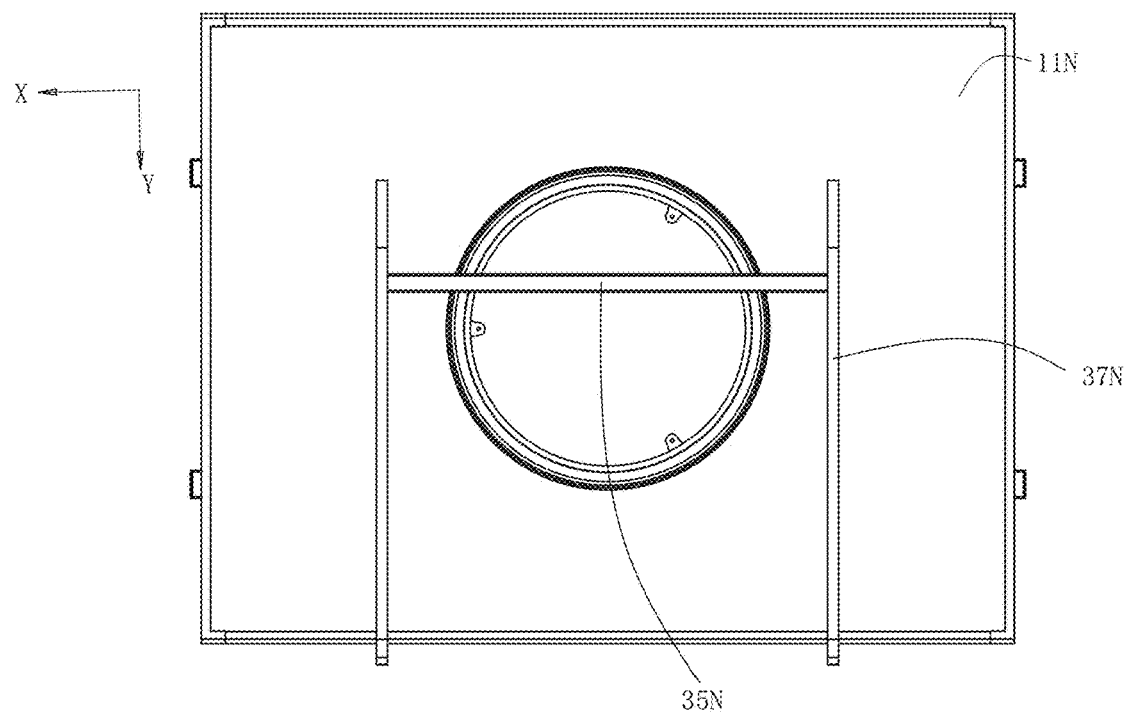
FIG. 44 is an illustrative top plan view of the puzzle platform of FIG. 43.
Figure 45:
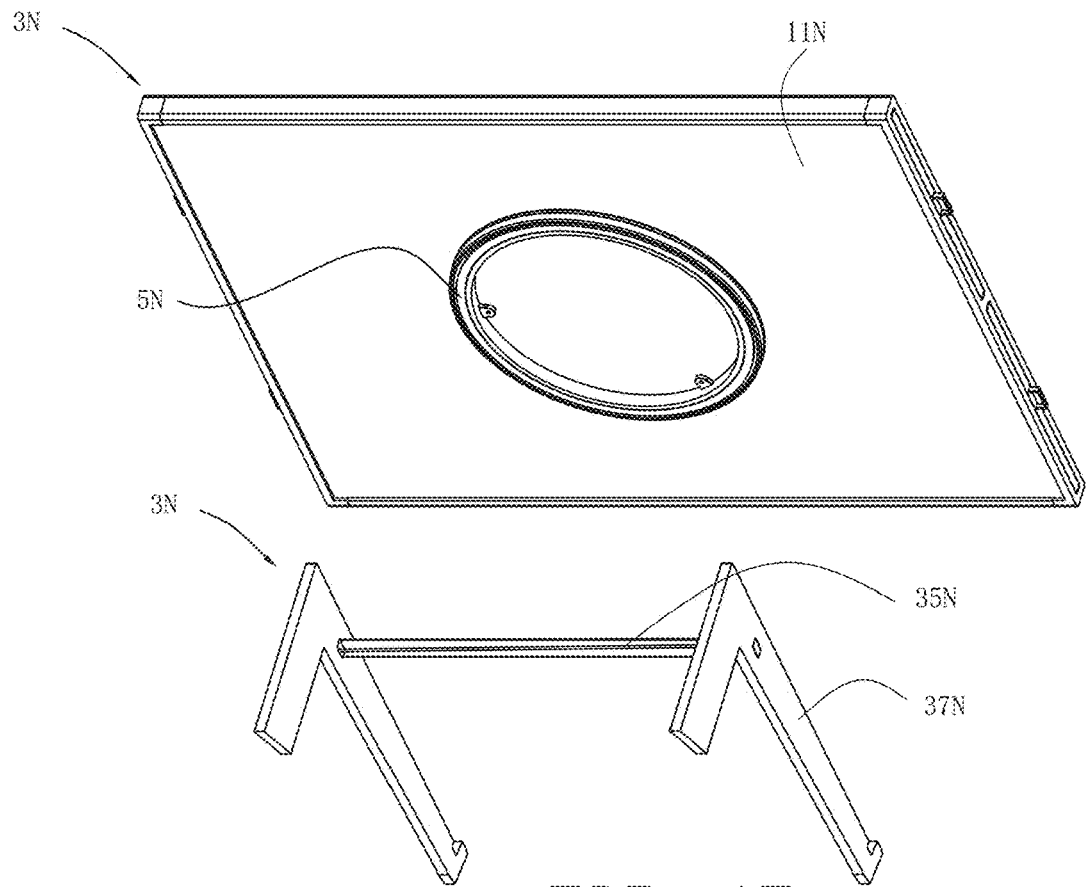
FIG. 45 is a partially exploded perspective view of the puzzle platform shown in FIG. 43.

Referring to FIGS. 43-45, a fifteenth embodiment is similar to the first embodiment of the present invention except that: the kickstand 3N and the puzzle board 1N are generally two-piece types. When using the kickstand 3N, the kickstand 3N needs to be assembled with the puzzle board 1N first. When the kickstand 3N supports the puzzle board 1N, the puzzle plate 11N, the rotating device 5N, and the puzzle drawers 17N are respectively inclined relative to the playing place.

When the kickstand 3N does not support the puzzle board 1N, if the kickstand 3N is removed from the puzzle board 1N, the puzzle board 1N can be rotated on the playing place via the rotating device 5N. The kickstand 3N and the rotating device 5N are spaced apart in the thickness direction of the puzzle plate 11N. A plane in which the puzzle plate 11N is located is defined as a projection plane. The projection of the kickstand 3N on the projection plane and the projection of the rotating device 5N on the projection plane at least partially overlap. By reasonably arranging the positional relationship between the kickstand 1N and the rotating device 5N, the overall structure of the puzzle platform 10N is reasonable and compact. The kickstand 3N comprises a pair of extending arms 35N spaced apart along the first direction X and a connecting arm 37N that simultaneously connects the two extending arms 35N. The extending arms 35N extend along the second direction Y. The connecting arm 37N of the kickstand 3N and the rotating device 5N are spaced apart in the thickness direction of the puzzle plate 11N. The projection of the connecting arm 37N of the kickstand 3N on the projection plane and the projection of the rotating device 5N on the projection plane at least partially overlap. The extending arms 35N of the kickstand 3N and the rotating device 5N are spaced apart along the first direction X. The projection of the extending arms 35N of the kickstand 3N on the projection plane and the projection of the rotating device 5N on the projection plane do not overlap.

In this embodiment, the rotating device 5N and the puzzle board 1N are one integral body. In an alternative embodiment, the rotating device 5N and the puzzle board 1N are generally two-piece types. When it is necessary to rotate the puzzle board 1N, the rotating device 5N is assembled with the puzzle board 1N.

Although good results have been shown with the kickstand being strip-shaped, rectangular or H-shaped, it is within the scope of the present invention for numerous other shapes of the kickstand to be used to achieve the desired functionality as described herein.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A puzzle platform for placing on a playing place, comprising:
   a puzzle board having a puzzle plate for placing a plurality of puzzle pieces thereon and at least one puzzle drawer located below the puzzle plate;
   a kickstand for supporting the puzzle board on the playing surface;
   a rotating device coupled to the puzzle board and spaced apart from the kickstand;
   wherein when the kickstand supports the puzzle board, the puzzle plate, the rotating device, and the puzzle drawer are inclined relative to the playing place, and the rotating device is in a non-working state;
   when the kickstand does not support the puzzle board, the puzzle board is capable of being rotated on the playing place via the rotating device, and the kickstand is in a non-working state; and
   wherein a plane in which the puzzle plate is located is defined as a projection plane, a projection of the kickstand on the projection plane and a projection of the rotating device on the projection plane do not overlap.

2. The puzzle platform, as recited in claim 1, wherein, the projection of the kickstand on the projection plane falls within a range of the projection of the rotating device on the projection plane.

3. The puzzle platform, as recited in claim 2, wherein a diameter of the rotating device is greater than a length of the kickstand.

4. The puzzle platform, as recited in claim 1, wherein the kickstand is rotatably connected to the puzzle board, the kickstand can be rotated around a rotating axis between a closed position and an open position, the kickstand has a rotating end rotating around the rotating axis and a free end far from the rotating end, and when the kickstand is in the open position, the free end of the kickstand supports on the playing place.

5. The puzzle platform, as recited in claim 4, wherein the rotating device comprises a near end close to the rotating axis, and the near end of the rotating device is closer to the rotating axis than the free end of the kickstand.

6. The puzzle platform, as recited in claim 5, wherein the rotating device further comprises a far end far from the rotating axis, and the far end is closer to the rotating axis than the free end.

7. The puzzle platform, as recited in claim 4, wherein the rotating device comprises a near end close to the rotating axis, and the free end of the kickstand is closer to the rotating axis than the near end of the rotating device.

8. The puzzle platform, as recited in claim 1, wherein the puzzle platform further comprises a connecting frame coupled on the puzzle plate, and the rotating device is connected to the connecting frame away from the puzzle plate.

9. The puzzle platform, as recited in claim 8, wherein the connecting frame has an avoidance groove for receiving the kickstand.

10. The puzzle platform, as recited in claim 1, further comprises a reinforcing member located below the puzzle plate, the rotating device is connected to the puzzle board via the reinforcing member.

11. The puzzle platform, as recited in claim 1, further comprises a reinforcing member located below the puzzle plate, the reinforcing member comprises a pair of first reinforcing ribs spaced apart from each other for forming a receiving chamber, the kickstand is received in the receiving chamber.

12. The puzzle platform, as recited in claim 11, wherein the puzzle board further comprises an extending wall for supporting the puzzle plate and a stopping rib coupled with the puzzle plate and spaced apart from the extending wall for abutting against the kickstand when the kickstand is in the open position.

13. The puzzle platform, as recited in claim 11, wherein the reinforcing member further comprises a reinforcing rib received in the receiving chamber for coupling with the kickstand.

14. The puzzle platform, as recited in claim 11, wherein the kickstand is coupled with the first reinforcing ribs.

15. The puzzle platform, as recited in claim 1, wherein the kickstand is made of metal wires.

16. The puzzle platform, as recited in claim 1, wherein the rotating device comprises a hollow area, the kickstand is opened through the hollow area of the rotating device.

17. The puzzle platform, as recited in claim 1, wherein the rotating device has a support surface protruding from the puzzle board away from the puzzle plate, when the kickstand is in a closed position, the kickstand is closer to the puzzle plate of the puzzle board relative to the support surface.

18. The puzzle platform, as recited in claim 1, wherein the rotating assembly is separated from the kickstand along a first direction of the puzzle board.

19. A puzzle platform, comprising:
a puzzle board having a puzzle plate for assembling a plurality of puzzle pieces thereon and at least one puzzle drawer located below the puzzle plate;
a kickstand for supporting the puzzle board;
a rotating device coupled to the puzzle board and spaced apart from the kickstand;
a reinforcing member located below the puzzle plate;
wherein when the kickstand supports the puzzle board, the puzzle plate, the rotating device, and the puzzle drawer are inclined, while the rotating device is in a non-working state;
when the kickstand does not support the puzzle board, the puzzle board is capable of being rotated on the playing place by the rotating device, while the kickstand is in a non-working state; and
wherein the reinforcing member comprises a pair of first reinforcing ribs spaced apart from each other for forming a receiving chamber, and the kickstand is received in the receiving chamber.

20. The puzzle platform, as recited in claim 19, wherein a plane in which the puzzle plate is located is defined as a projection plane; when the kickstand does not support the puzzle board, a projection of the kickstand on the projection plane and a projection of the rotating device on the projection plane do not overlap.

21. The puzzle platform, as recited in claim 19, wherein a diameter of the rotating device is greater than the length of the kickstand.

22. The puzzle platform, as recited in claim 19, wherein the puzzle platform further comprises a connecting frame coupled on the puzzle plate, and the rotating device is mounted on the connecting frame.

23. The puzzle platform, as recited in claim 19, wherein the kickstand is coupled with the first reinforcing ribs.

24. A puzzle platform, comprising:
a puzzle board having a puzzle plate for assembling a plurality of puzzle pieces thereon and at least one puzzle drawer located below the puzzle plate;
a kickstand for supporting the puzzle board;
a rotating device coupled to the puzzle board and spaced apart from the kickstand;
wherein when the kickstand supports the puzzle board, the puzzle plate, the rotating device, and the puzzle drawer are inclined, while the rotating device is in a non-working state;
when the kickstand does not support the puzzle board, the puzzle board is capable of being rotated on the playing place by the rotating device, while the kickstand is in a non-working state; and
wherein the rotating device has a support surface protruded from the puzzle board; when the kickstand does not support the puzzle board, the kickstand is closer to the puzzle plate of the puzzle board than the support surface.

25. The puzzle platform, as recited in claim 24, wherein a plane in which the puzzle plate is located is defined as a projection plane, when the kickstand does not support the puzzle board, a projection of the kickstand on the projection plane and a projection of the rotating device on the projection plane do not overlap.

26. The puzzle platform, as recited in claim 24, wherein the support surface of the rotating device protruded from the puzzle board along a thickness direction of the puzzle plate.

27. The puzzle platform, as recited in claim 24, wherein the puzzle platform is capable of placing on a playing place, when the kickstand supports the puzzle board on the playing place, the support surface is spaced apart from the playing place.

28. The puzzle platform, as recited in claim 27, wherein the kickstand has a rotating end coupled with the puzzle board and a free end far from the rotating end, when the kickstand supports the puzzle board on the playing place, the rotating end is further away from the playing place than the support surface.

29. The puzzle platform, as recited in claim 24, wherein a diameter of the rotating device is greater than a length of the kickstand.

30. The puzzle platform, as recited in claim 24, wherein a length of the kickstand is greater than a diameter of the rotating device.

* * * * *